US012738471B2

United States Patent
(12) United States Patent
Bowdler

(10) Patent No.: US 12,738,471 B2
(45) Date of Patent: Sep. 15, 2026

(54) TIME OF FLIGHT MASS SPECTROMETER CONTROL UNIT APPLYING A DYNAMIC POTENTIAL DIFFERENT BETWEEN AT LEAST TWO ELECTRODES OF AN ION GATE

(71) Applicant: KRATOS ANALYTICAL LIMITED, Manchester (GB)

(72) Inventor: Andrew Bowdler, Manchester (GB)

(73) Assignee: KRATOS ANALYTICAL LIMITED, Manchester (GB)

( * ) Notice: Subject to any disclaimer, the term of this patent is extended or adjusted under 35 U.S.C. 154(b) by 296 days.

(21) Appl. No.: 18/288,489

(22) PCT Filed: Apr. 28, 2022

(86) PCT No.: PCT/EP2022/061389
§ 371 (c)(1),
(2) Date: Oct. 26, 2023

(87) PCT Pub. No.: WO2022/233714
PCT Pub. Date: Nov. 10, 2022

(65) Prior Publication Data

US 2024/0213013 A1 Jun. 27, 2024

(30) Foreign Application Priority Data

May 4, 2021 (GB) ..................................... 2106342

(51) Int. Cl.
*H01J 49/40* (2006.01)
*H01J 49/16* (2006.01)

(52) U.S. Cl.
CPC ............ *H01J 49/40* (2013.01); *H01J 49/164* (2013.01)

(58) Field of Classification Search
CPC .. H01J 49/00; H01J 49/02; H01J 49/26; H01J 49/34; H01J 49/421; H01J 49/426;
(Continued)

(56) References Cited

U.S. PATENT DOCUMENTS 5,986,258 A 11/1999 Park
2007/0023645 A1* 2/2007 Chernushevich ....... H01J 49/40 250/281
(Continued)

FOREIGN PATENT DOCUMENTS

EP 1770754 A1 4/2007
EP 1 901 332 A1 3/2008
(Continued)

OTHER PUBLICATIONS

Translation of Communication issued Oct. 1, 2024 in Japanese Application No. 2023-567969.
(Continued)

*Primary Examiner* — Jason L McCormack
(74) *Attorney, Agent, or Firm* — Sughrue Mion, PLLC

(57) ABSTRACT

A time of flight ("TOF") mass spectrometer having a control unit that is configured to control the TOF mass spectrometer to perform at least one acquisition cycle that includes operating a variable voltage unit to apply a dynamic potential difference between at least two electrodes of an ion gate. The dynamic potential difference is configured so that, within the/each acquisition cycle; a first potential difference is applied between the at least two electrodes in a first state at a first time; and a second potential difference is applied between the at least two electrodes at a second time. At least one of the first and second states of the ion gate is an intermediate state in which the ion gate deflects the ions
(Continued)

passing through the ion gate such that some but not all of the ions passing through the ion gate are prevented from reaching a detector.

17 Claims, 17 Drawing Sheets

(58) Field of Classification Search
CPC ........ H01J 49/427; H01J 49/446; H01J 49/40; H01J 49/164; H01J 49/403; H01J 49/061
USPC ................................ 250/281, 282, 285, 287
See application file for complete search history.

(56) References Cited

U.S. PATENT DOCUMENTS

2007/0284521 A1 12/2007 Green et al.
2008/0230688 A1* 9/2008 Bowdler ................ H01J 49/40 250/282
2009/0294647 A1* 12/2009 Michelmann ......... H01J 49/004 250/282
2013/0181125 A1 7/2013 Guna et al.
2015/0048245 A1* 2/2015 Vestal .................. H01J 49/403 250/282

FOREIGN PATENT DOCUMENTS

EP 2771902 B1 7/2020
GB 2537148 A 10/2016
JP 2007-173229 A 7/2007
JP 2014-535049 A 12/2014
WO 2013/061097 A2 5/2013

OTHER PUBLICATIONS

Kia Ni et al., "Study of ion transmission for a linear mode Bradbury-Nielsen gate in ion mobility spectrometer", International Journal of Mass Spectrometery, 2015, pp. 1-5.
International Search Report for PCT/EP2022/061389 dated Aug. 10, 2022.

* cited by examiner

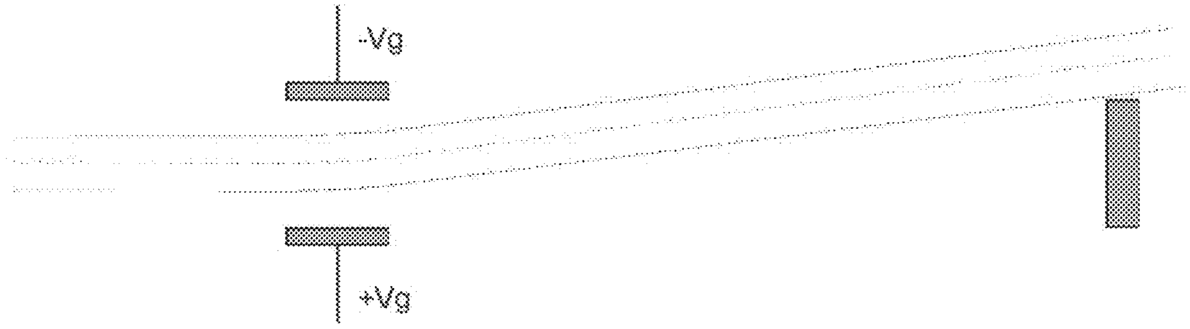
FIG. 4(c)(i)
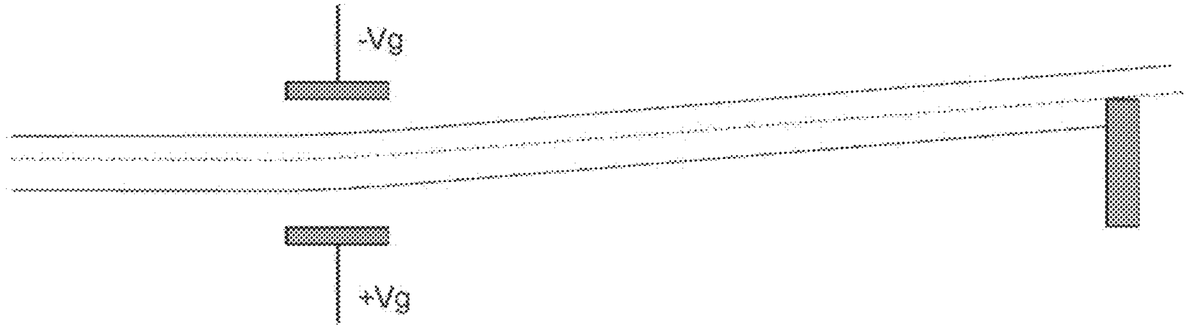
FIG. 4(c)(ii)
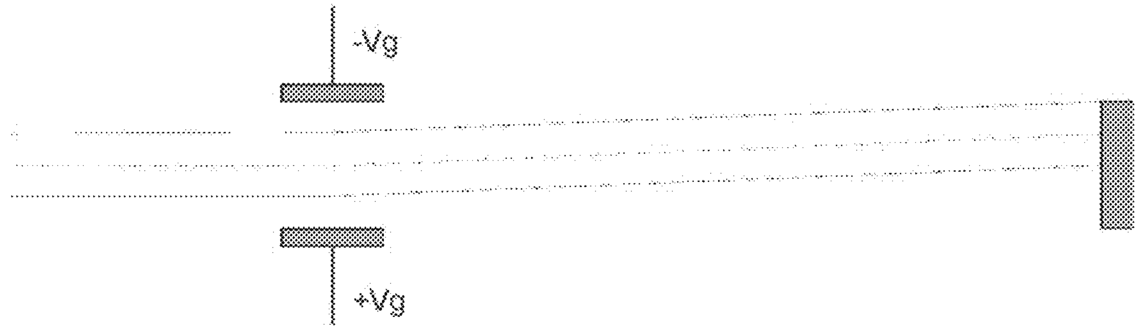
FIG. 4(c)(iii)

TIME OF FLIGHT MASS SPECTROMETER CONTROL UNIT APPLYING A DYNAMIC POTENTIAL DIFFERENT BETWEEN AT LEAST TWO ELECTRODES OF AN ION GATE

This Application is a National Stage of International Application No. PCT/EP2022/061389 filed Apr. 28, 2022, claiming priority based on Great Britain Patent Application No. 2106342.5 filed May 4, 2021.

FIELD OF THE INVENTION

The present invention relates to a time of flight ("TOF") mass spectrometer.

BACKGROUND

A mass spectrometer is a well-known instrument commonly used for identifying a compound from the molecular or atomic masses of its constituents and/or to elucidate the structure of a molecule, by recording ions produced by ionising the compound/molecule.

An example TOF mass spectrometer 100 is shown in FIG. 1(*a*). This example TOF mass spectrometer 100 includes an ion source 110 configured to produce ions having a plurality of mass-to-charge ratios (m/z values), a field free drift region 130 configured to separate ions produced by the ion source according to their m/z value, and a detector 150 configured to produce an output current representative of the relative abundance of ions having different m/z values striking the detector 150.

In the example TOF mass spectrometer of FIG. 1(*a*), the ion source 110 is a MALDI ion source that includes a laser 112 for ionising a sample carried on a sample plate 116 by firing light at the sample. The MALDI ion source 110 may additionally include acceleration/extraction electrodes 114 for accelerating ions produced by the ion source 110 and/or viewing optics 118 (which may include an illumination source) for viewing a sample under test. The TOF mass spectrometer 100 may include one or more ion optic components for manipulating ions produced by the ion source, e.g. for accelerating, decelerating, steering, deflecting, reflecting, focussing and/or re-focussing ions produced by the ion source 110. In the TOF mass spectrometer 100 of FIG. 1(*a*), the ion optic components include focussing elements 120 located at a (preferably optimal/optimised) position in the field free drift region 130.

In use, the MALDI ion source 110 is operated to produce ions having a plurality of m/z values by using the laser 112 to fire a pulse of light at a sample under test, which is located on a sample plate 116. Typically, prior to analysis the sample under test is kept at a constant high voltage of several kilovolts, normally up to 30 kilovolts. When the laser is focused onto a compound sample (typically to a width of 100 um±50 um), the compound sample ionizes, and the ions leave the surface with a large spread of initial velocities. Focusing widths may vary for different applications from a few microns to a few hundred microns.

In the depicted example, the acceleration/extraction electrodes 114 are used to accelerate the ions produced by the ion source towards the detector 150 such that ions having different m/z values strike the detector at different times. Typically this is achieved creating a potential difference between the sample and acceleration/extraction electrodes 114 by application of a high voltage pulse to the acceleration/extraction electrodes 114 and/or sample plate 116, which preferably occurs at an optimised moment in order to reduce the initial spread in velocities for ions having m/z values of interest. Normally the high voltage pulse is applied at some time interval after ions are initially produced by the ion source 110, i.e. after the laser pulse. Typically this interval is of several 10 s of nanoseconds to several microseconds after the laser pulse. The accelerated ions then exit the MALDI ion source 110, typically through an exit electrode in the ion source (usually held at ground potential), to form an ion beam emerging into the field free drift region 130 towards the detector 150.

The ion optic components may include one or more sets of electrodes as necessary along the ion beam path, e.g. for providing directional correction and/or collimation. The collimating elements 120 are an example of such additional sets of electrodes. An ion gate (e.g. ion gate 280 as shown in FIG. 3(*a*)) is another example of such additional sets of electrodes.

Normally ions produced by the ion source 110 will have almost the same kinetic energy, so that their velocity will be mass dependant. When ions have almost the same kinetic energy, the ions having different m/z values will have different times of flight according to their m/z value (this is illustrated by FIG. 14(*b*), discussed below), and thus will ultimately strike the detector 150 at different times. Measuring the flight time of the ions after the laser pulses (start) and current produced by the detector allows calculation of the m/z values, since ions with smaller m/z values strike the detector sooner than ions with larger m/z values.

The example TOF mass spectrometer 100' of FIG. 1(*b*) is similar to that of FIG. 1(*a*), but includes an ion mirror 170 which includes a series of reflecting elements, which may be used to extend flight path as well as to improve (by reducing) kinetic energy spread. This type of TOF mass spectrometer is generally referred to as a "reflectron".

For a conventional TOF mass spectrometer, the detector 150 will normally include a secondary electron multiplier (SEM) detector, such as a discrete dynode electron multiplier detector ("EM detector" herein) or a microchannel plate detector ("MCP detector" herein).

Most SEM detectors work by converting ions striking an impact surface into ("primary") electrons, which are then amplified into a larger number of ("secondary") electrons in a cascade manner, which are subsequently collected by a collector. In case of an EM detector, the average number of secondary electrons that is produced from a single primary electron determines the gain at each dynode stage, and the total gain of the detector is a result of the electron amplification efficiency over all dynodes in the chain. The electron amplification efficiency depends on for example the material composition of the surface of the dynodes and the voltage between successive dynodes (the gain voltage). In order to detect ions with low abundance, it is usually necessary to operate an EM detector at a higher gain value.

A characteristic of detectors typically used in TOF mass spectrometers is the dependence of the detector sensitivity not only on ion abundance, but also on the energy and speed of the ions at the impact surface or first dynode of the detector (where ions are converted to electrons to be multiplied in the subsequent gain stages). For ions produced by a MALDI ion source, ions impacting the detector are produced by the laser desorption method. Accelerated groups of ions strike the impact surface of the detector with different impact velocities, depending on the mass of the ions and the accelerating voltages. The effective gain of the detector is therefore strongly dependant on the mass range and is not constant, i.e. the effective gain is higher for the lower mass ions, which have a relatively high impact velocity, and lower for the higher mass ions, which have a significantly lower impact velocity.

The detector is typically one of the most stressed parts of a TOF mass spectrometer and the lifetime of a detector is strongly affected e.g. by the operating voltage used (which as noted above impacts the gain of the detector), the output current and the operating pressure levels. High use can result in sensitivity deterioration and/or contamination on the secondary emissive surface, an effect which is sometimes referred to as detector "ageing". Therefore, detectors in TOF mass spectrometers often require frequent attention, such as gain tuning (i.e. adjusting the operating voltage applied to the detector), in order to maintain instrument performance. This can be done by the user, by a service engineer or by automated gain adjustments (between acquisition cycles) via software. In newer generation instruments, where operational speed and throughput have increased markedly, detector failure is a more frequent occurrence, incurring substantial cost due to the need to replace the detector.

Another problem with the detectors typically used in TOF mass spectrometers is saturation. Saturation of a detector can occur when the output current (which can be referred to as the "ion signal") produced by the detector for ions having a particular m/z in a given acquisition cycle depletes the active (electron multiplication) surfaces of the detector and/or the current from the power supply so that the effective gain of the detector reduces, and therefore becomes lower for following masses with higher m/z values. Detector saturation is a particular problem for samples with low analyte concentration, or those with a high degree of impurities, or for samples with a wide mass range of interest (e.g. above 1000 Da). Some samples may require high laser fluence, which can significantly increase the background chemical noise (especially in the low mass range <800 Da), causing the detector to saturate and underperform.

Due to the nature of MALDI sample preparation and ion production by a MALDI ion source, very large ion signals are produced in the low mass range, due to high-impact high-velocity ions at low masses, especially the ions from sample matrices; this significantly contributes to the ageing process and/or saturation of the electron multiplier. In addition, MALDI TOF mass spectrometers normally operate lasers with a power that is within a very small window around an optimum laser power, the so called 'laser threshold', and any increase in the laser power above this threshold tends to produce excessive ion signal that saturates the detector.

In view of the above, the present inventors believe that it would be desirable to reduce significantly the effects of mass dependence and saturation in the detector and hence reduce the effect of low mass ions on the detector gain.

A common solution to the problem of detector saturation is to use an ion gate to blank out the low mass signals so that they are not detected. This allows the detector to be set at gain appropriate for the higher masses without the low mass peaks causing saturation (because they do not reach the detector). Such a scheme is very effective for dealing with unwanted low mass peaks such as MALDI matrix ions and has been in common use for many years. However, in very complex samples such as for microbiology, the low mass peaks are important because the masses useful for identification of the micro-organisms cover a very wide mass range. Ion blanking cannot be used in such applications and the problem of mass dependent sensitivity and saturation are therefore much more significant.

Our previous patent application GB2537148 disclosed a method for correcting the detector gain characteristic of a TOF mass spectrometer by applying different voltages to a detector at different times during an acquisition cycle. Typically, to compensate for a gain characteristic of a detector, a gain voltage of around 2500V will be adjusted by 10% over a period of 100 us.

FIG. 2 illustrates figuratively a comparison of (a) the voltage applied to a detector and (b) the resulting effective gain of the detector during an example acquisition cycle, where the detector has a constant operating voltage applied to it (solid lines) and a dynamic voltage waveform applied to it as taught in GB2537148 (dashed lines). From this, it can be seen that applying a dynamic voltage waveform to the detector during the acquisition cycle can correct the detector gain characteristic of a TOF mass spectrometer.

However, the present inventor has observed that internal capacitance and resistance of the detector limits the speed with which the detector gain characteristics can be corrected. Another drawback of the method taught by GB2537148 observed by the present inventor is that, in practice, a non-standard detector might be required to supply the dynamic gain voltage internally to the detector to achieve the necessary speed of response and make it possible to adjust the intensity of narrow m/z regions (with high or low intensity). This may in turn make the supply electronics more complicated, particularly for micro-channel plate ("MCP") detectors (compared with, for example, discrete dynode EM detectors).

Another document which teaches a dynamic gain method similar to that taught by GB2537148 is U.S. Pat. No. 8,890,086B1

The present invention has been devised in light of the above considerations.

SUMMARY OF THE INVENTION

In a first aspect of the invention, there is provided a time of flight ("TOF") mass spectrometer having:

an ion source;

a detector;

an ion gate positioned on a path extending between the ion source and the detector;

a variable voltage unit; and a control unit;

wherein the control unit is configured to control the TOF mass spectrometer to perform at least one acquisition cycle that includes:

operating the ion source to produce and emit ions having a plurality of mass/charge (m/z) values so that ions having different m/z values follow the path extending between the ion source and the detector and reach the detector at different times;

operating the detector to produce an output current representative of ions having different m/z values reaching the detector;

operating the variable voltage unit to apply a dynamic potential difference between at least two electrodes of the ion gate during the acquisition cycle so that a magnitude of the potential difference applied between the at least two electrodes varies within the acquisition cycle;

wherein the dynamic potential difference is configured so that, within the/each acquisition cycle;

a first potential difference is applied between the at least two electrodes of the ion gate by the variable voltage unit such that the ion gate is in a first state at a first time, when ions having a first m/z value are passing through the ion gate; and a second potential difference is applied between the at least two electrodes of the ion gate by the variable voltage unit such that the ion gate is in a second state at a second time that is later than the first time, when ions having a second m/z value are passing through the ion gate;

wherein at least one of the first and second states of the ion gate is an intermediate state in which the ion gate deflects the ions passing through the ion gate such that some but not all of the ions passing through the ion gate are prevented from reaching the detector.

In this way, the amount of ions reaching the detector can be controlled as a function of m/z value such that the effects of mass dependent detector sensitivity, saturation of the detector and reduced lifetime due to high signal levels can be mitigated.

An advantage of controlling the amount of ions reaching the detector using potentials applied to the ion gate in the manner described herein (compared with GB2537148 discussed above) is that the capacitance of an ion gate is typically much lower than that of a detector (pF vs nF), and therefore the state of the ion gate can be switched between states with a good speed of response, without the need for a non-standard detector, and regardless of the type of detector (unlike GB2537148 discussed above). This makes it possible to adjust the intensity of narrow m/z regions (with high or low intensity) which cannot be achieved with the dynamic gain method of GB2537148. Also, with the present invention, the gain of the detector can potentially be fixed at a value suitable for the lowest intensity peaks and these can be transmitted at 100% efficiency to the detector and with no loss of sensitivity.

There may be a plurality of acquisition cycles. Preferably, the dynamic potential difference is the same within each acquisition cycle.

In a typical TOF mass spectrometer, ions are produced and emitted by the ion source and travel towards the detector at a speed dependent on their m/z value. When the ions reach the detector an output current is produced representative of ions having different m/z values.

The TOF mass spectrometer would typically include at least one field free region on the path extending between the ion source and the detector. The TOF mass spectrometer would typically be configured to operate at a vacuum level of $10^{-2}$ Pa or lower, more typically $10^{-3}$ or lower, noting such ranges are typical for a TOF mass spectrometer.

In the first aspect of the invention, the ion gate is preferably positioned on a path extending between the ion source and the detector, such that substantially all of the ions emitted by the ion source pass through the ion gate.

The mass spectrometer may include an ion mirror. In this case, the path may extend between the ion source and the detector via the ion mirror. The ion gate is preferably positioned on a portion of the path which extends from the ion source to the ion mirror.

The dynamic potential difference applied between the at least two electrodes of the ion gate during the/each acquisition cycle preferably controls (at least in part) the proportion of ions emitted from the ion source and passing through the ion gate that reach the detector. As ions pass through the ion gate, the ion gate may, depending on the potential difference applied between the at least two electrodes of the ion gate, deflect the ions, thereby altering their path and preventing some or all of them from reaching the detector. The amount of deflection will typically depend on the magnitude of the potential difference applied between the at least two electrodes of the ion gate (a larger potential difference will in general cause more deflection, and therefore will prevent a larger proportion of ions from reaching the detector) Therefore, as the ions travel at a speed dependent on their m/z value, the proportion of ions reaching the detector can be controlled as a function of m/z value by altering the dynamic potential difference applied between the at least two electrodes of the ion gate, i.e. the proportion of ions of a particular m/z value prevented from reaching the detector can be controlled by applying a particular potential difference between the at least two electrodes of the ion gate at a particular time when ions of that m/z value are passing through the ion gate.

The ion gate is preferably configured to prevent ions from reaching the detector primarily by deflecting ions such that the ions do not reach the detector, rather than annihilating such ions in the ion gate. This configuration is different from an ion gate as used e.g. in ion mobility mass spectrometry (IMS) where ions are typically moving much more slowly (in a buffer gas) and ions are prevented from reaching a detector by annihilation of those ions in the ion gate (typically by using the ion gate to guide ions into an annihilation electrode which forms part of the ion gate). In a MALDI TOF mass spectrometer the kinetic energy of the ions is typically 20 keV which is 10 or 100 times higher than that for IMS and in order to operate in the ion annihilation mode would require the voltages on the electrodes to be similarly very high. The application of a potential of 20 kV or more to ion gate electrodes is impractical due to high voltage breakdown and is made worse by being a dynamic potential. By deflecting the ions with the ion gate it is only necessary to apply potential of up to +/−500V to the electrodes of the ion gate to control the intensity of 20 keV ions reaching the detector. Such a potential will not cause high voltage breakdown and can be produced as a dynamic potential with practical and cost effective power supplies.

The reason the intermediate state is able to prevent some but not all of the ions passing through the ion gate from reaching the detector is that the ion beam passing through the ion gate will have a finite width (several mm diameter) and the ion beam will be steered across the active area of the detector by the potential difference applied between the at least two electrodes such that part of the ion beam misses the active area of the detector such that it is not detected (this is discussed in more detail below with reference to FIGS. 4(*c*)(*i*)-(*iii*)). The larger the potential difference between the electrodes, the higher the proportion of the ion beam that misses the active area of the detector. This is an unconventional use of an ion gate, since an ion gate is conventionally operated in either an open or closed state, e.g. to perform "ion blanking" or as described above.

The first potential difference and the second potential difference should be different in magnitude, such that the first state of the ion gate when the first potential difference applied between the at least two electrodes of the ion gate is different from the second state of the ion gate when the second potential difference is applied between the at least two electrodes of the ion gate.

For avoidance of any doubt, the potential difference applied between the at least two electrodes of the ion gate by the variable voltage unit could, at one or more times during the/each acquisition cycle, be zero. For example, a gate open potential difference (as discussed below) could be 0V (and indeed may preferably be 0V in most cases).

The dynamic potential difference applied between the at least two electrodes of the ion gate during the/each acquisition cycle preferably controls (at least in part) the proportion of ions emitted from the ion source and passing through the ion gate that reach the detector so as to compensate for a gain characteristic of the detector (ideally to result in the mass spectrometer acting as if the detector has a substantially constant gain, i.e. such that the output current produced by the detector reflects ion abundance in substantially the same way at all m/z values in the range of m/z values for which the TOF mass spectrometer is configured for use). This might be achieved at least in part by having the magnitude of the first potential difference larger than the magnitude of the second potential difference, e.g. as discussed below in relation to FIG. 3.

However, compensating for a gain characteristic is not the only potential use of the present invention. For example, the dynamic potential difference applied between the at least two electrodes of the ion gate during the/each acquisition cycle preferably controls (at least in part) the proportion of ions emitted from the ion source and passing through the ion gate that reach the detector in order to adjust the relative intensities of m/z peaks, e.g. to adjust the intensity of narrow m/z regions (with high or low intensity). Note that this is more easily achievable with the present invention (compared with the dynamic gain method of GB2537148) owing to the lower capacitance of an ion gate compared with a typical detector (as discussed above).

Preferably, the magnitude of the first potential difference is larger than the magnitude of the second potential difference.

Since the second time is later than the first time, ions having the first m/z value will typically have a smaller m/z value compared with ions having the second m/z value, since in a typical TOF mass spectrometer, ions having a smaller m/z value will reach the detector (and the ion gate) more quickly than ions having a larger m/z value. Therefore, by having the first potential difference larger than the second potential difference, a larger proportion of ions having the first m/z value may be prevented from reaching the ion detector compared with the proportion of ions having the second m/z value that is prevented from reaching the ion detector. This may be useful to provide increased sensitivity at the second m/z value relative to the first m/z value, e.g. to compensate for a gain characteristic of the detector or to otherwise adjust the relative intensities of m/z peaks in a desired manner.

However, it is also possible for the magnitude of the first potential difference to be smaller than the magnitude of the second potential difference, e.g. to increase sensitivity at lower m/z values, as might be useful if there is only a small number of lower m/z value ions.

The dynamic voltage waveform may be configured so that, within the/each acquisition cycle:

a gate closed potential difference is applied between the at least two electrodes of the ion gate by the variable voltage unit such that the ion gate is in a gate closed state at one or more predetermined gate closed times, when ions having one or more predetermined gate closed m/z values are passing through the ion gate, wherein the ion gate prevents substantially all of the ions emitted from the ion source and passing through the ion gate from reaching the detector when it is in the gate closed state.

The phrase "substantially all" is used here because some small fraction of ions passing through the ion gate when the ion gate is in a gate closed state could potentially still reach the detector, e.g. through collisions with other parts of the mass spectroscopy apparatus.

For avoidance of any doubt, the term "gate closed" in "gate closed voltage", "gate closed state", "gate closed times" and "gate closed m/z values" is being used as a label, simply to distinguish the voltage, state, times and m/z values being referenced from other voltages, states, times and m/z values referred to herein.

The dynamic voltage waveform may be configured so that, within the/each acquisition cycle:

a gate open potential difference is applied between the at least two electrodes of the ion gate by the variable voltage unit such that the ion gate is in a gate open state at one or more predetermined gate open times, when ions having one or more predetermined gate open m/z values are passing through the ion gate, wherein the ion gate prevents substantially none of the ions emitted from the ion source and passing through the ion gate from reaching the detector when it is in the gate open state.

The phrase "substantially none" is used here because some small fraction of ions passing through the ion gate when the ion gate is in a gate open state could potentially be prevented by the ion gate from reaching the detector, e.g. through collisions with parts of the ion gate.

For avoidance of any doubt, the term "gate open" in "gate open voltage", "gate open state", "gate open times" and "gate open m/z values" is being used as a label, simply to distinguish the voltage, state, times and m/z values being referenced from other voltages, states, times and m/z values referred to herein.

A magnitude of a gate closed potential difference will typically be higher than a magnitude of a gate open potential difference. For avoidance of any doubt, the gate open potential difference may be 0V (and indeed may preferably be 0V in some cases).

An intermediate state of the ion gate may be achieved by the variable voltage unit applying an intermediate potential difference between the at least two electrodes of the ion gate, wherein the magnitude of the intermediate potential difference is between that of the gate open potential difference and the gate closed potential difference.

Preferably, the dynamic potential difference is configured so that, within the/each acquisition cycle, the ion gate is put in different intermediate states at different times during the acquisition cycle, whereby each intermediate state prevents a different proportion of ions passing through the ion gate from reaching the detector, wherein each intermediate state may be obtained by the variable voltage unit applying a different intermediate potential difference between the at least two electrodes of the ion gate (preferably whose magnitude is between that of the gate open potential difference and the gate closed potential difference value). Hence, there could be "a first intermediate state", "a second intermediate state", and so on (e.g. up to an "nth intermediate state").

For avoidance of any doubt, the term "intermediate" in "intermediate voltage", "intermediate state" is being used as a label, simply to distinguish the voltage/state being referenced from other voltages/states referred to herein.

Preferably, the first potential difference is a gate closed potential difference, and the second potential difference is an intermediate potential difference as described above, i.e. such that the first state is a gate closed state and the second state is an intermediate state.

Accordingly, the dynamic potential difference is configured so that, within the/each acquisition cycle;

a gate closed potential difference is applied between the at least two electrodes of the ion gate by the variable voltage unit such that the ion gate is in a gate closed state at the first time, when ions having a first m/z value are passing through the ion gate; and an intermediate potential difference is applied between the at least two electrodes of the ion gate by the variable voltage unit such that the ion gate is in an intermediate state at the second time that is later than the first time, when ions having a second m/z value are passing through the ion gate.

This may be useful to provide increased sensitivity at the second m/z value relative to the first m/z value, e.g. to compensate for a gain characteristic of the detector or to otherwise adjust the relative intensities of m/z peaks in a desired manner.

In this case, the dynamic voltage waveform may be further configured so that, within the/each acquisition cycle:

a gate open potential difference is applied between the at least two electrodes of the ion gate by the variable voltage unit such that the ion gate is in a gate open state at a third time later than the second time, when ions having a third m/z value are passing through the ion gate.

This may be useful to provide increased sensitivity at the third m/z value relative to the second m/z value, e.g. to compensate for a gain characteristic of the detector or to otherwise adjust the relative intensities of m/z peaks in a desired manner.

The magnitude of the difference between the magnitude of the gate open potential difference and the magnitude of the gate closed potential difference may be 1000V or less, but could be 500V or less, 200V or less, or in some cases may be 100V or less. The magnitude of the difference between the gate open potential difference and the gate closed potential difference may be 10V or more, 20V or more, more preferably 50V or more. Experiments have shown that the transmission of ions can be affected by potential differences of as little as 10V.

For avoidance of any doubt, it is not necessary for the first potential difference to be a gate closed potential difference, or for the second potential difference to be an intermediate potential difference. For example, in other examples, the first potential difference could be an intermediate potential difference with the second potential difference being a gate open potential difference (or indeed a different intermediate potential difference).

Preferably, the dynamic voltage waveform is configured to vary the potential difference applied between the at least two electrodes of the ion gate such that the potential difference changes continuously, e.g. from the first potential difference to the second potential difference (optionally also from the second potential difference to the third potential difference). However, it is also possible for the dynamic voltage waveform to be configured to vary the potential difference applied between the at least two electrodes of the ion gate such that the potential difference changes discretely (step-wise), e.g. from the first potential difference to the second potential difference (optionally also from the second potential difference to the third potential difference).

Preferably, the dynamic voltage waveform could be configured to vary the potential difference applied between the at least two electrodes of the ion gate such that the potential difference progressively changes in one direction only (e.g. only increasing or only decreasing in magnitude with time). However, it is also possible for the dynamic voltage waveform to be configured to vary the potential difference applied between the at least two electrodes of the ion gate in a more complex manner (e.g. with numerous rises and falls in magnitude), depending e.g. on the desired effect on ions passing through the ion gate being sought at different m/z values. Note that this is more easily achievable with the present invention (compared with the dynamic gain method of GB2537148) owing to the lower capacitance of an ion gate compared with a typical detector (as discussed above). Indeed, the present inventor believes the maximum speed of gain variation achieved using a detector is perhaps 10× less than that achieved using an ion gate owing to this difference in capacitance.

From an implementation perspective, the dynamic voltage waveform should change at a rate which matches the rate of change of m/z of the ions passing through the ion gate. Effectively, the gate has an inherent mass selection resolution limit defined by the relative size of the effective length of the ion gate to the distance from the ion source. This will determine the maximum rate of change of the dynamic voltage waveform for an effect to be seen.

The ion gate is preferably configured such that it permits a greater proportion of ions with larger m/z values to reach the detector than ions with smaller m/z values. This configuration is particularly desirable when examining biological samples as it prevents the ions with smaller m/z values from saturating the detector and improves detector sensitivity. In addition, the gain of the detector can remain constant which extends the lifetime of the detector.

For example, in some examples the dynamic voltage waveform may be configured to vary the potential difference applied between the at least two electrodes of the ion gate such that the potential difference progressively decreases in magnitude with time within the/each acquisition cycle.

Preferably, operating the variable voltage unit to apply the dynamic potential difference between the at least two electrodes of the ion gate includes applying voltages of opposite polarity to different electrodes of the ion gate. The voltages of opposite polarity are preferably equal in magnitude. For example, if the ion gate includes two electrodes (e.g. two plate electrodes as described below), then operating the variable voltage unit to apply the dynamic potential difference between the two electrodes may include applying voltages of opposite polarity (preferably voltages equal in magnitude but of opposite polarity, e.g. +V and −V) to the two electrodes. For example, if the ion gate includes more than two electrodes (e.g. a set of parallel wires as described below), then operating the variable voltage unit to apply the dynamic potential difference between the more than two electrodes may include applying voltages of opposite polarity (preferably voltages equal in magnitude but of opposite polarity, e.g. +V and −V) to alternate electrodes in the more than two electrodes.

Preferably, the at least two electrodes of the ion gate are distributed along an axis that is locally transverse to the path extending between the ion source and the detector.

In a simple arrangement, the ion gate may include two electrodes (e.g. two plate electrodes) distributed at different positions along a lateral axis that is transverse (preferably perpendicular) with respect to the path extending between the ion source and the detector, wherein the dynamic potential difference is applied between the two electrodes, preferably by applying voltages of opposite polarity (preferably voltages equal in magnitude but of opposite polarity, e.g. +V and −V) to the two electrodes, i.e. with one of the two electrodes having a voltage of a first polarity (e.g. +V)

applied to it and with the other of the two electrodes having a voltage of a second polarity (e.g. −V) applied to it. However, a simple arrangement of two plate electrodes is less useful than a BN ion gate as discussed below, as the effective length of the ion gate is much bigger.

Preferably, the ion gate includes a set of parallel wires distributed at different positions along a lateral axis that is transverse (preferably perpendicular) with respect to the path extending between the ion source and the detector, e.g. as in the known "Bradbury Neilson" (or "BN") ion gate. Preferably, for such an ion gate, the dynamic potential difference is applied between each pair of adjacent wires in the set of parallel wires, preferably by applying voltages of opposite polarity (preferably voltages equal in magnitude but of opposite polarity, e.g. +V and −V) to alternate wires in the set of parallel wires, i.e. with every second one of the set of parallel wires having a voltage of a first polarity (e.g. +V) applied to it and with the others of the set of parallel wires having a voltage of a second polarity (e.g. −V) applied to it.

In some examples, the ion gate may include a first set of parallel wires distributed at different positions along a first lateral axis that is transverse (preferably perpendicular) with respect to the path extending between the ion source and the detector, and a second set of parallel wires distributed at different positions along a second lateral axis that is transverse (preferably orthogonal) with respect to the path extending between the ion source and the detector and is also transverse (preferably orthogonal) with respect to the first lateral axis, e.g. as in a known variant of the "Bradbury Neilson" gate which is referred to herein as a "double BN ion gate". Preferably, for such an ion gate, the dynamic potential difference is applied between each pair of adjacent wires in each set of parallel wires in each of the first and second sets, preferably by applying voltages of opposite polarity (preferably voltages equal in magnitude but of opposite polarity, e.g. +V and −V) to alternate wires in each set of parallel wires. Here it is noted that the ions are only affected by the ion gate PD for the time that they are within effective range (of the electric field from the wires). For an interleaved wire (BN) ion gate with a wire spacing of 0.5 mm such as ours, this is only 1-2 mm. By having two ion gates 5 mm apart, the effective length becomes 7-9 mm. So in practice, a double BN ion gate might not be quite as effective as a single BN ion gate at controlling the proportion of ions being detected by the detector, because of this slight increase in effective length (since this increase in effective length can cause the mass accuracy to decrease slightly). A single gate may also afford a wider voltage range. Nonetheless, the present inventor has found that the present invention works well with either a single or double BN gate, and a double BN gate is useful to achieve sharper ion blanking (when the ion gate is in a gate closed state). So ultimately, whether a single BN gate or double BN gate is used may vary depending on application requirements.

If the ion gate includes one or more sets of parallel wires (see above), the wires in the/each set may have a thickness (e.g. diameter) of 50 um or less, more preferably 25 um or less.

If the ion gate includes one or more sets of parallel wires (see above), the separation between adjacent wires in the/each set may be 1 mm or less, more preferably 500 um or less.

In practice, the wire spacing may be chosen to be as small as reasonably practical (to produce a short effective length in the direction of travel of the ions) and the thickness of the wires should be as small as reasonably possible to reduce the losses of ions by collision with the wires. The maximum transmission may be calculated as (1-d/D) where d is the wire diameter and D is the spacing. For 25 um wires with 500 um spacing the maximum transmission may thus be calculated as 0.95 (95%)

Preferably, the plurality of conductive wires deflect ions as they pass through the ion gate, wherein the amount of deflection is dependent on the magnitude of the voltage provided to the ion gate by the variable voltage unit.

From an implementation perspective, the ion gate preferably is configured so as to not significantly affect the speed (time-of-flight) and/or the trajectories of the ions that reach the detector, since differences in arrival time at the detector cause the mass accuracy (due to peak position) and/or mass resolution (due to peak shape and/or width) to be adversely affected. The ion gate might reasonably be expected to influence the speed of the ions due to the electric field whilst the ions are physically within the ion gate. The ion gate might also reasonably be expected to influence the arrival time of the ions due to the off axis trajectories of ions that are deflected but still reach the detector. Where high mass resolution and mass accuracy are desired, even small perturbations such as described above would be expected to produce observable (and undesirable) effects.

A BN ion gate has traditionally been used for ion blanking because the characteristics of the electric field due to the bipolar, interleaved wire construction means that the effective physical size of the ion gate in the direction of travel of the ions is very small. An ion gate has an inherent mass selection resolution limit defined by the relative size of the effective length of the ion gate to the distance from the ion source so that the mass selection resolution of a BN ion gate can be very high, especially when used with fast high voltage pulses (for example see our patent GB2413213).

The field in a BN ion gate should normally be orthogonal to the direction of travel of the ions and all ions should get the same magnitude of deflection. However, in practice, an ion beam is finite in size and not fully collimated (it can be either slightly divergent or convergent). The exact influence of the field depends on the incident angle as well as the distance of the ions from the wires of the ion gate. Also, the direction of deflection is opposite for the parts of the ion beam passing through adjacent pairs of wires (because they have alternating polarity). The ion beam with a single nominal trajectory may become two ion beams with opposite off axis trajectories after the ion gate. For these reasons the BN ion gate has found use as a digital (on/off) ion gate, i.e. where the ion gate is either fully closed (so that ions do not reach the detector) or fully open (so that ions of certain m/z values can be selected to reach the detector) typically for ion blanking purposes.

However, the present inventor has surprisingly found that by appropriate design of the mass spectrometer and the ion gate (preferably configured as a BN ion gate), the ion gate can be operated in an analogue mode to control the intensity of ions reaching the detector dynamically with m/z without the above effects causing a significant deterioration in for example peak shape or resolution or accuracy. From a practical perspective, the present inventor has found that the best results from the present invention can be obtained where the ion source of the mass spectrometer is capable of producing an adequately collimated ion beam and where the ion gate produces a sufficiently small off axis deflection so as to introduce an effectively negligible change in energy and/or off axis time of flight at the detector. This is achieved most easily if the ion gate is the BN design, since with the BN design the relative size of the ion gate in the direction of flight of the ions is very small and when the ion gate is operated with a low potential difference between the wires.

The mass spectrometer may include a power supply, wherein the variable voltage unit is configured to apply the dynamic potential difference between the at least two electrodes of the ion gate by modulating an operating voltage provided by the power supply.

Alternatively, the variable voltage unit may be a power supply whose output voltage is varied.

The ion source may be a MALDI ion source.

In a second aspect of the invention, there is provided a method of operating a TOF mass spectrometer according to the first aspect of the invention. The method of the second aspect may include any method step implementing or corresponding to a TOF mass spectrometer described with reference to the first aspect.

A method according to the second aspect of the invention may include a method of operating a TOF mass spectrometer to perform at least one acquisition cycle as set out in the first aspect of the invention. In a third aspect of the invention, there is provided a method of modifying a TOF mass spectrometer so as to provide a TOF mass spectrometer according to the first aspect of the invention. The TOF mass spectrometer may have (prior to performing the method): an ion source, a detector, a control unit. The method may optionally include adding the ion gate and variable voltage unit to the TOF mass spectrometer (e.g. if these components were not already included in the TOF mass spectrometer). The method may include configuring the control unit of the mass spectrometer to control the TOF mass spectrometer in accordance with the first aspect of the present invention.

The method according to the third aspect of the invention may include installing a variable voltage unit in a TOF mass spectrometer.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 3(*b*) illustrates figuratively a dynamic potential difference applied between the electrodes of the ion gate of the mass spectrometer of FIG. 3(*a*), and the consequent effect on ion transmission and detected signal intensity.

FIGS. 4(*c*)(*i*)-(*iii*) illustrate pictorially how an ion beam might deflected by an ion gate when the ion gate is in (i) closed, (ii) intermediate, and (iii) open states

FIG. 14(*b*) is a graph illustrating the times of flight to the ion gate for ions with masses ranging from 600 Da to 2400 Da resulting from the simulations illustrated in FIGS. 8 to 13.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 3A:
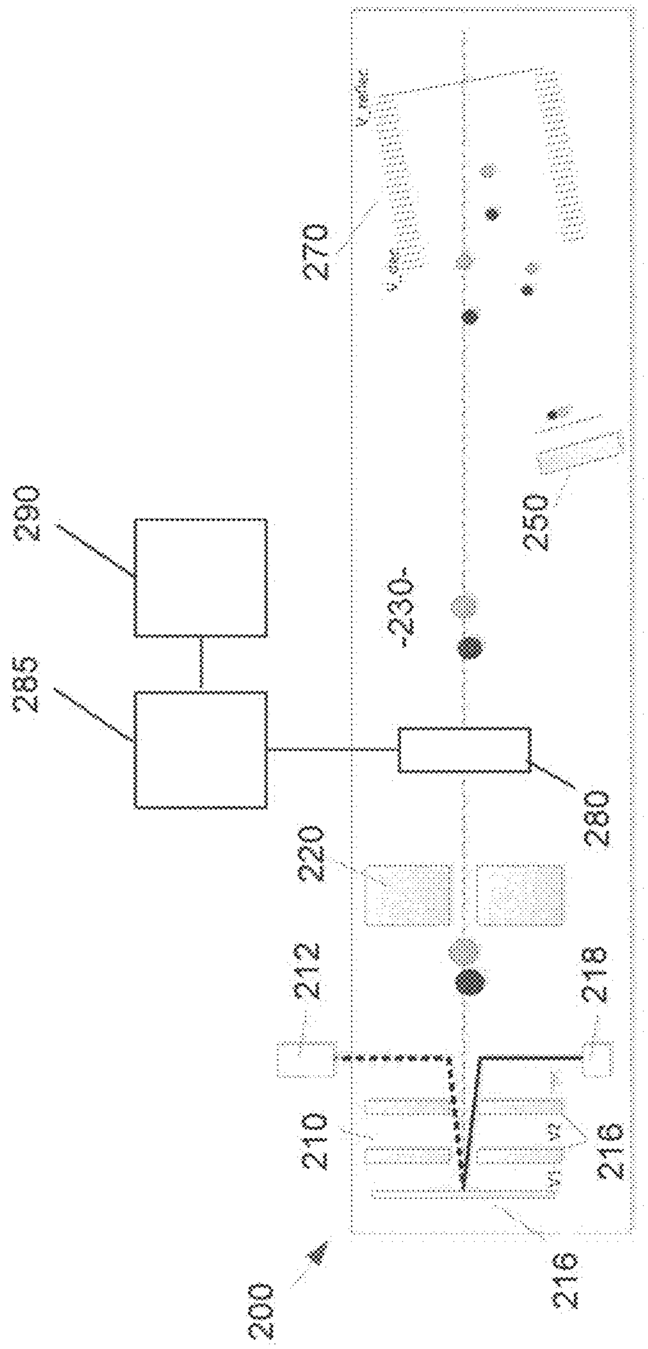
FIG. 3(*a*) illustrates an example time of flight ("TOF") mass spectrometer 200 with which the present invention may be implemented.
Figure 3B:
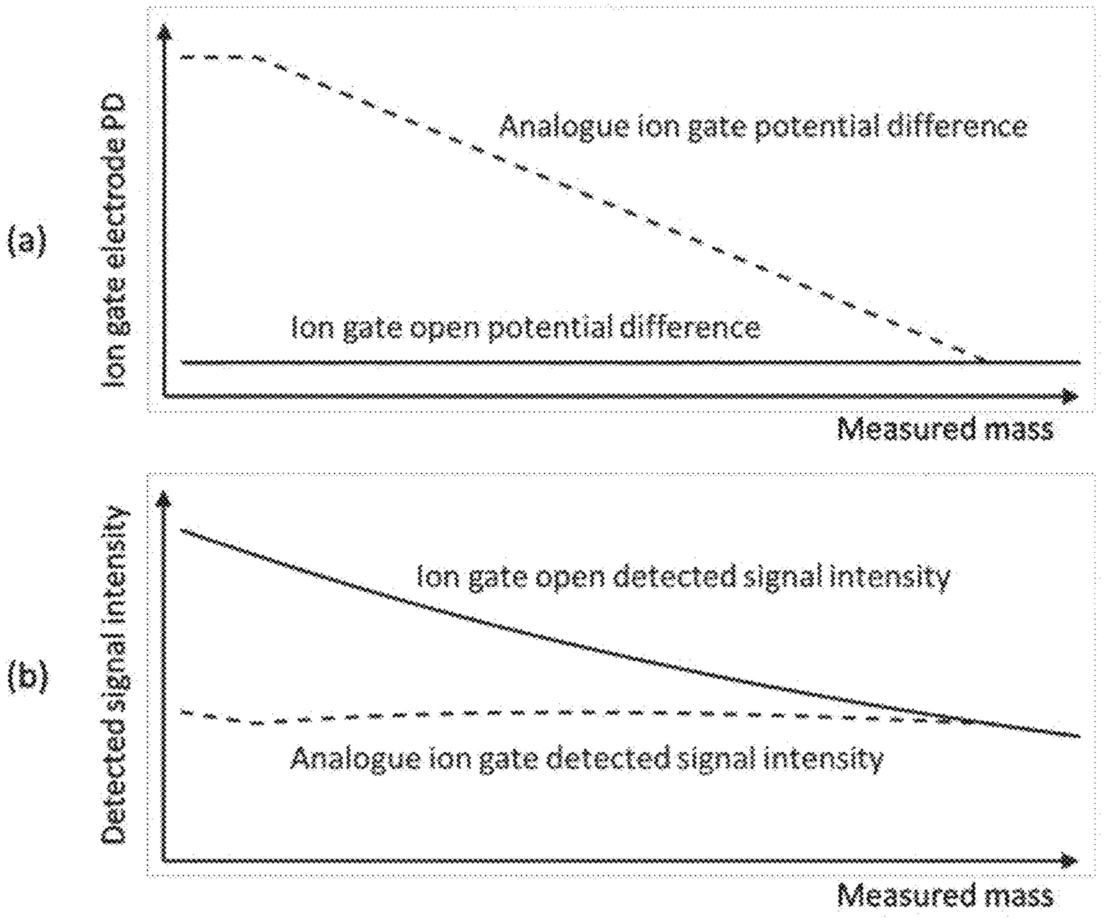

FIG. 3(*a*) illustrates an example time of flight ("TOF") mass spectrometer 200 with which the present invention may be implemented.

Figure 1:
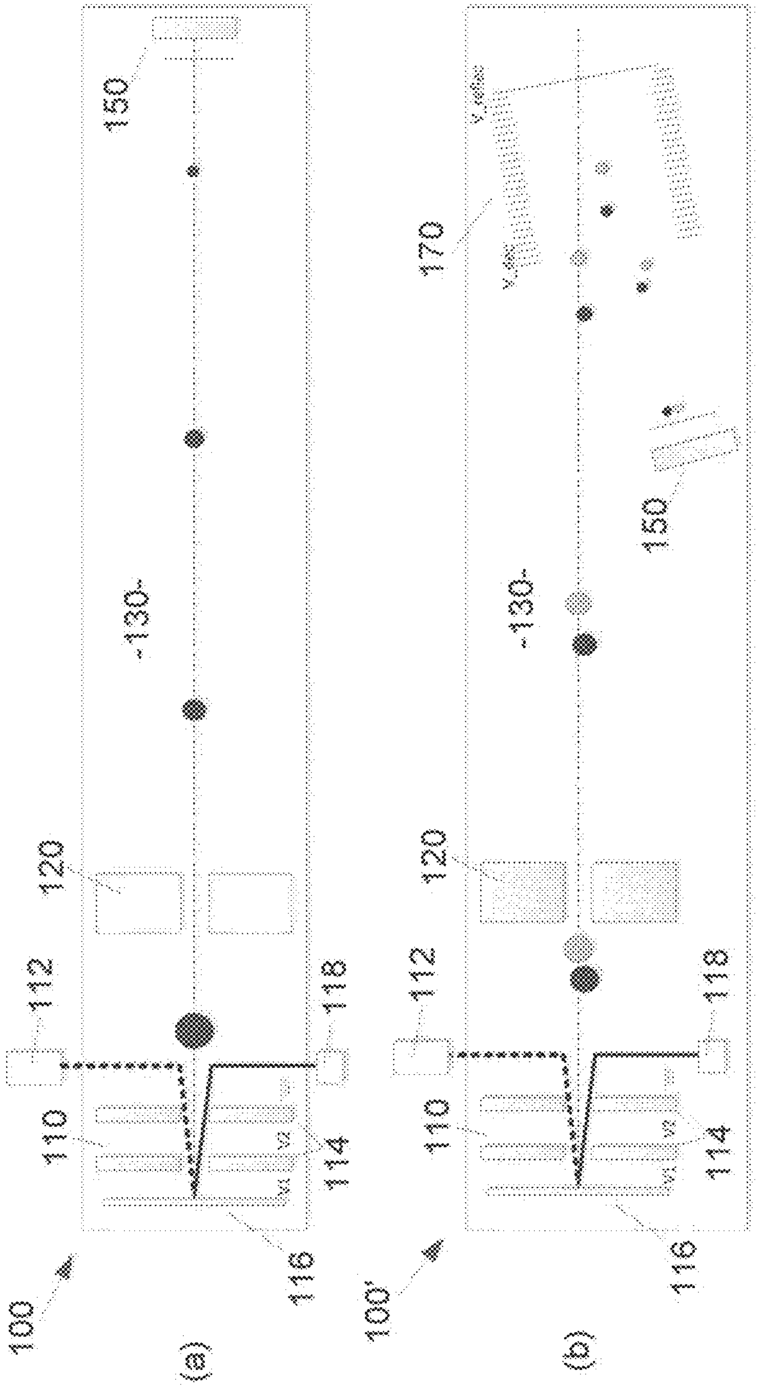
FIG. 1 shows (a) an example linear TOF mass spectrometer and (b) an example reflectron TOF mass spectrometer.
Figure 2:
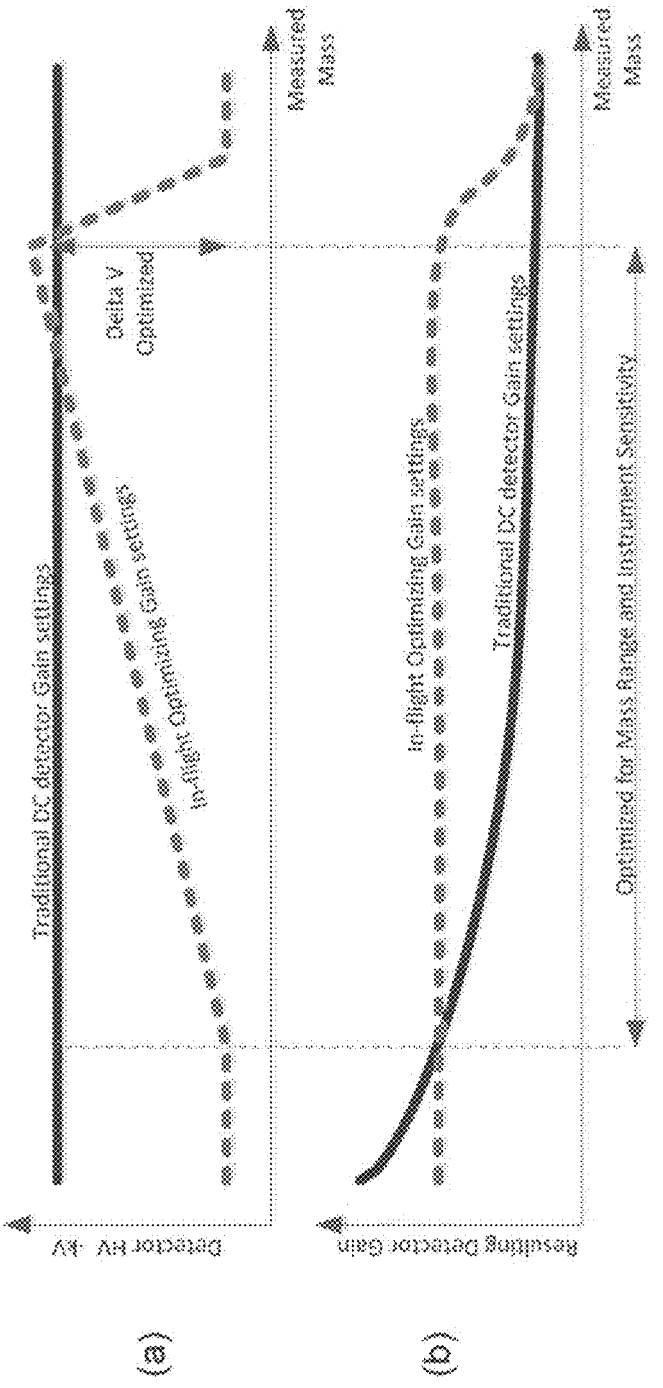
FIG. 2 illustrates figuratively a comparison of (a) the voltage applied to a detector and (b) the resulting effective gain of the detector during an example acquisition cycle, where the detector has a constant operating voltage applied to it (solid lines) and a dynamic voltage waveform applied to it as taught in GB2537148 (dashed lines).

The TOF mass spectrometer 200 of FIG. 3(*a*) is the same as the reflectron TOF mass spectrometer 100', except for the addition of an ion gate 280, a control unit 290, and a variable voltage unit 285. Alike reference numerals have been given corresponding reference numerals to the reflectron TOF mass spectrometer 100' of FIG. 1(*b*), and do not need to be described in further detail unless otherwise stated.

Ion gates 280 are well-known in the field of mass spectrometry for the purposes of ion blanking and/or ion mass selection.

With reference to FIG. 3(*a*), ion gates are generally positioned in the field free drift region 230, on a path extending between the ion source 210 and the detector 250. In the example shown in FIG. 3(*a*), this path extends between the ion source 210 and the detector 250 via an ion mirror 270. Conventionally, ion gates such as ion gate 280 are used to apply a transverse electrostatic field across an ion beam to deflect unwanted ions away from the detector 250, e.g. for the purposes of ion blanking and/or ion mass selection.

Figure 4A:
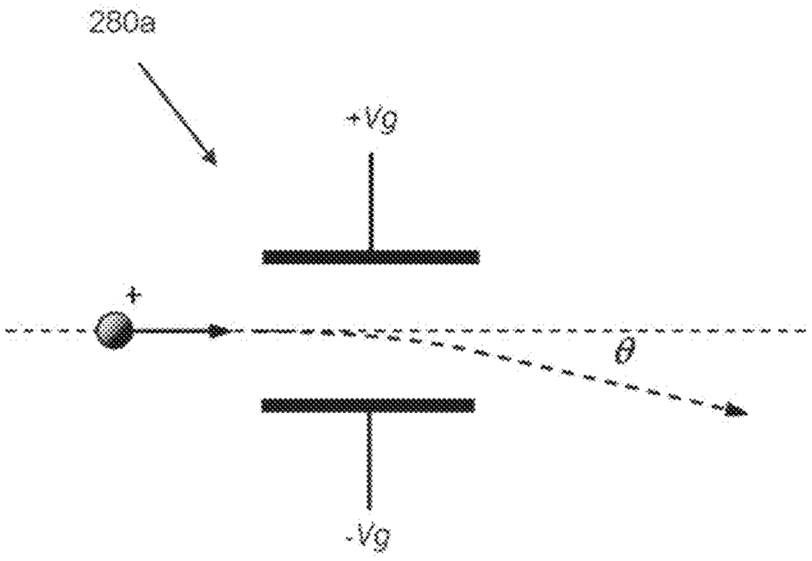
FIGS. 4(*a*) and 4(*b*) illustrates a schematic comparison of ions travelling through (a) a parallel plate ion gate and (b) a BN gate.
Figure 4B:
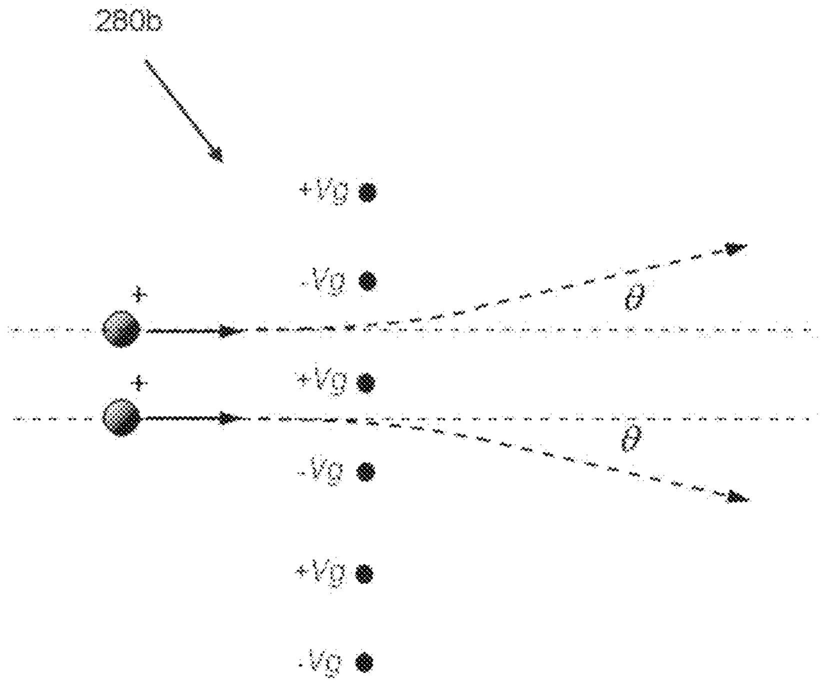

FIG. 4(*a*) illustrates the path taken by ions travelling through a parallel plate ion gate 280*a*, as might be used in the TOF mass spectrometer 200 of FIG. 3(*a*).

A positive voltage (+Vg) is applied to one plate and a negative voltage (−Vg) is applied to a second plate, thereby applying potential difference between the two plates. Ions passing through the parallel plate ion gate 280*a* are deflected by the electric field between the two plates, as illustrated.

The deflection angle, θ of singly charged ions deflected from the ion path by the parallel plate ion gate 280*a* may be given by Equation 1 for small values of θ, where U is the ion kinetic energy of the ions (in eV), $V_g$ is the magnitude of the voltage applied to each of the parallel plates (equating to a potential difference of $2V_g$), d is the spacing between pairs of plates, L is the effective length of the ion gate.

$$\theta = \frac{V_g}{U}\frac{L}{d} \quad \text{Equation 1}$$

For example, in the case of a 20 keV ion beam with a diameter of 5 mm at a detector with active area of 10 mm in diameter and 500 mm away from the ion-gate, the ion beam will completely miss the detector when it is 7.5 mm off axis (e.g. as illustrated pictorially in FIG. 4(*c*)(*i*) discussed below). For an ion-gate made of two parallel plate electrodes with effective length of 10 mm and 10 mm spacing this requires +/−300V to be applied to the ion-gate.

Such an ion-gate although having the advantage of a simple construction, has some practical drawbacks. Principally, this is because the electrostatic field extends out from the ion-gate by a distance similar to the spacing of the electrodes; in this case several mm from the ion-gate so that the effective length of the gate is large and its selection mass resolution is poor.

FIG. 4(*b*) illustrates the path taken by ions travelling through an interleaved wire ion gate 280*b*, commonly referred to as a "Bradbury Neilson" (which can also be referred to as "BN" ion gate or even "BN" gate), as might be used in the TOF mass spectrometer 200 of FIG. 3(*a*).

BN gates are typically formed from a set of thin, closely spaced, parallel wires. Voltages of opposite polarities are applied to alternate electrodes in the set to create potential differences between adjacent pairs of wires.

In a similar way to the parallel plate ion gate 280*a* above, as ions travel through the pairs of parallel wires of the BN gate 280*b*, they are deflected from their normal path by the electric field created between the wires. However, because the spacing is much smaller than the diameter of the ion beam, different parts of the beam are deflected in opposite directions as the polarity of the field alternates from one pair of wires to the next. The main reason for using this design is that the field from the ion gate doesn't extend as far as that from the two parallel plates so that the effective length of the ion gate is much smaller and the selection mass resolution can be much higher. Because the length to spacing ratio of the wire electrodes is still about 1:1, the voltage required is similar to the parallel plate design.

FIGS. 4(*c*)(*i*)-(*iii*) illustrate pictorially how an ion beam might deflected by a parallel plate ion gate when the ion gate is in (i) closed, (ii) intermediate, and (iii) open states. Without wishing to be bound by theory, the inventor believes that ions in the appropriate m/z range will be deflected by the ion gate by the same amount, and that which ions strike the active area of the detector (and which miss the active area of the detector) will be determined by the position of the ions in the ion beam, and the strength of the potential difference applied to the ion gate, As shown here, the gate open potential difference is preferably chosen so that all ions strike the active area of the detector (FIGS. 4(*c*)(*iii*)); and the gate closed potential difference is preferably chosen so that substantially none of the ions strike the active area of the detector (FIGS. 4(*c*)(*i*)). In the intermediate state, the potential difference applied between the electrodes of the parallel plate ion gate is preferably chosen to deflect the ion beam so that some but not all of the ions reach the active area of the detector (FIGS. 4(*c*)(*ii*)).

Figure 5:
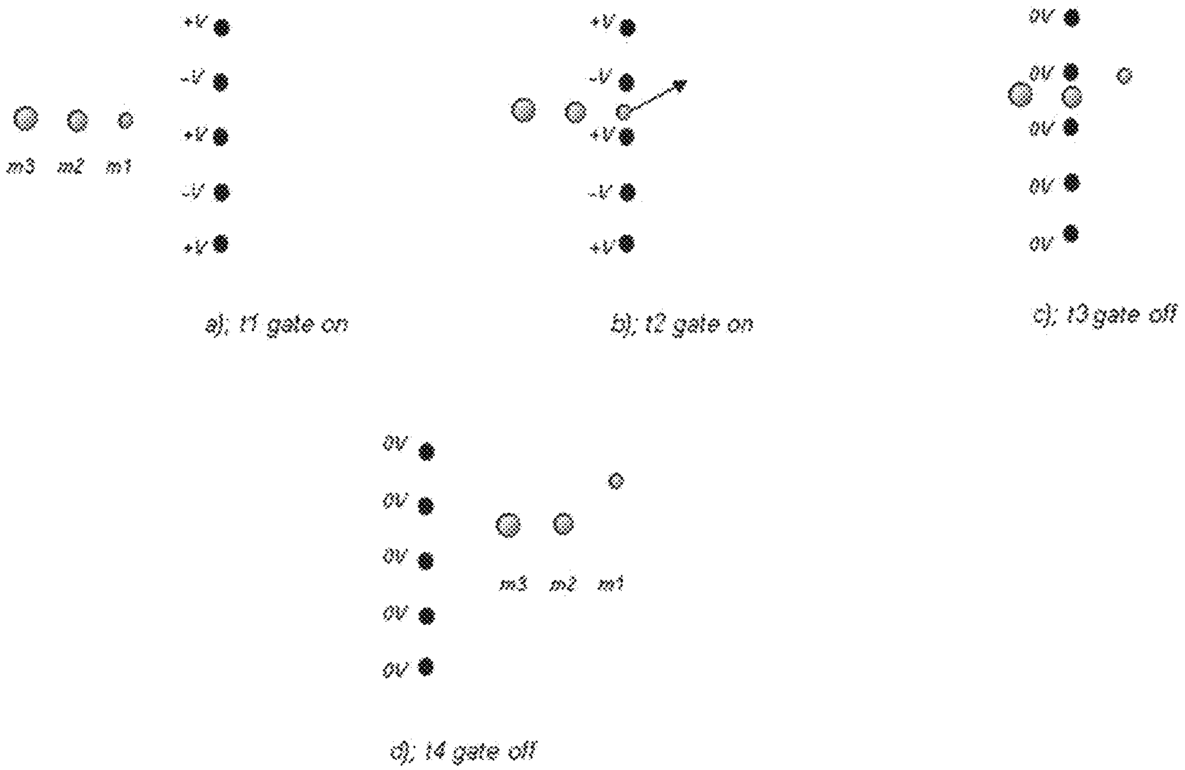
FIG. 5 is a schematic diagram of the operation of a BN gate used for ion blanking, where ions of mass m1 are deflected ("blanked") by the ion gate and ions of masses m2 and m3 pass through the ion gate un-deflected ("un-blanked").

Although not shown here, a BN ion gate is envisaged to work in a similar way, albeit that when a non-zero potential difference is applied to the BN ion gate, the ion beam is split in two as shown in FIG. 4(*b*). Thus, for a BN ion gate: the gate open potential difference is preferably 0V or low enough such that all ions strike the active area of the detector; and the gate closed potential difference is preferably a non-zero potential difference large enough so that both ion beams created by the non-zero potential difference miss the active area of the detector. In the intermediate state, the potential difference applied between the electrodes of the parallel plate ion gate is preferably between the gate open potential difference and the gate closed potential difference, so that some but not all of the ions in the two beams reach the active area of the detector FIG. 5 illustrates a common use of a BN ion gate for ion blanking. Ions with masses m1, m2 and m3 are emitted from the ion source and travel towards the BN gate. At a first time (t1) opposite polarity voltages are applied to alternate wires of the BN gate to create a transverse electrostatic field, meaning that the ion gate is "closed" or "turned on". At a second time (t2), ions with mass m1 passing through the BN gate are deflected due to their interaction with the electrostatic field. These ions do not reach the detector (they are "blanked"). At a third time (t3), the voltages are no longer applied to the wires of the BN gate, meaning that the BN gate is "open" or "turned off". At a fourth time (t4), ions with masses m2 and m3 have passed through the BN gate un-deflected. In this example, m1<m2<m3 and t1<t2<t3<t4.

Figure 6:
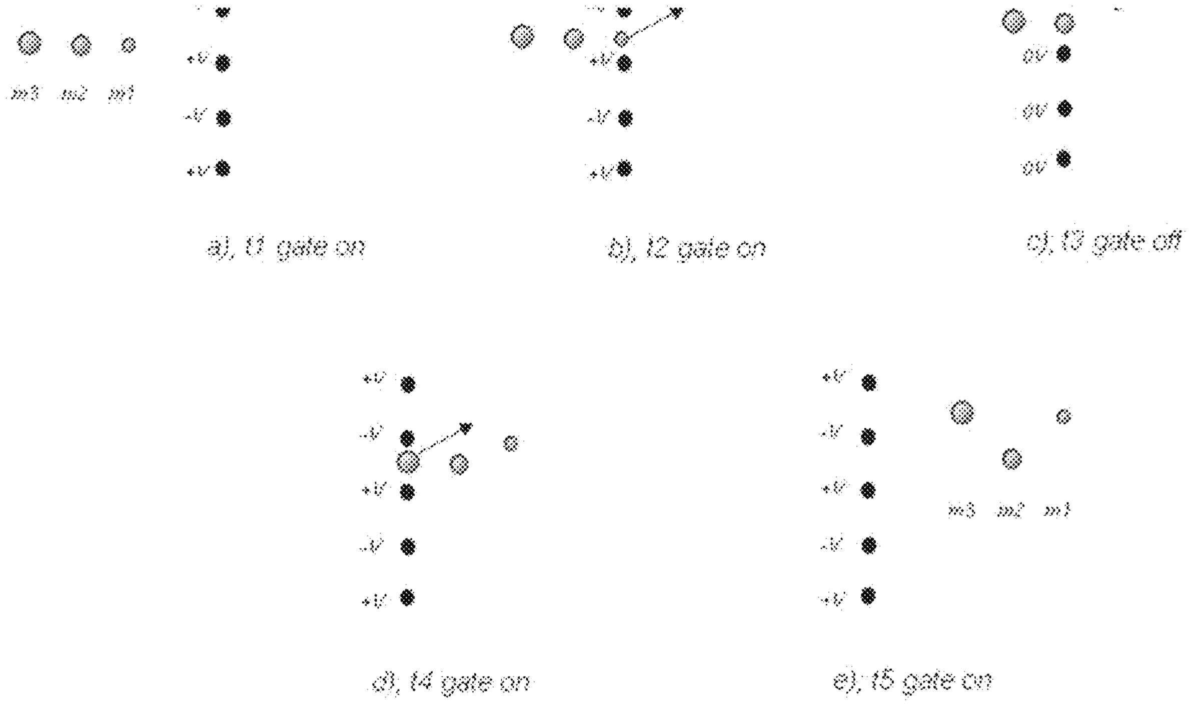
FIG. 6 is a schematic diagram of the operation of a BN gate used for mass selection, where ions of masses m1 and m3 are deflected ("blanked") by the ion gate and ions of mass m2 pass through the ion gate un-deflected ("selected").

FIG. 6 illustrates another common use of a BN gate for mass selection (or gating). Ions with masses m1, m2 and m3 are emitted from the ion source and travel towards the BN gate. At a first time (t1) opposite polarity voltages are applied to alternate wires of the BN gate to create a transverse electrostatic field, meaning that the BN gate is "closed" or "turned on". At a second time (t2), ions with mass m1 passing through the BN gate and are deflected from normal due their interaction with the electrostatic field and do not reach the detector. At a third time (t3), the voltages are no longer applied to the wires of the BN gate, meaning that the BN gate is "open" or "turned off". Ions with mass m2 pass through the BN gate un-deflected and carry on to the detector. At a fourth time (t4) the gate is turned back on by applying opposite polarity voltages to alternate wires of the BN gate, and ions with mass m3 are deflected from normal due to their interaction with the electrostatic field created. This means that only ions with mass m2 pass through the ion gate and are detected by the detector. This type of operation of an ion-gate ('mass selection') is normally used, in the art, for selecting parent ions for fragmentation in TOF MS/MS experiments. In this example, m1<m2<m3 and t1<t2<t3<t4.

Ion blanking and mass selection as illustrated in FIGS. 5 and 6 are digital in nature, meaning that the ion gate is either "on" or "off". When the ion gate is on, substantially all of the ions are deflected from their normal path. When the ion gate is off, substantially all of the ions pass through the ion gate un-deflected. In accordance with the present invention, the ion gate 280 may be operated in what the present inventor refers to as an "intermediate", "non-digital" or "analogue" mode by applying a dynamic voltage waveform to the ion gate during acquisition such that the ion gate is in an intermediate state in which the ion gate prevents some but not all of the ions passing through the ion gate from reaching the detector.

Both parallel plate ion gates such as the ion gate 280*a* shown in FIG. 4(*a*) and BN gates such as the BN gate 280*b* shown in FIG. 4(*b*) may be suitable for operating in this way. In practice, BN gates are preferred to parallel plate ion gates because the effective length (the distance that the electrostatic field extends from the ion gate) is less and the operating voltage is lower.

An ion gate such as the ion gate 280 can be put in an "intermediate" state by setting the potential difference applied between the ion gate electrodes to values in between those for fully on ("gate closed") or fully off ("gate open"). From Equation 1 for the deflection and the example values given above in relation to the simple parallel plate ion-gate shown in FIG. 4(*a*), it also follows that if the ion beam is deflected by 5 mm, half of it will still be hit the detector and half of the ions will be detected (e.g. as illustrated pictorially in FIGS. 4(*c*)(*ii*)). This happens when +/−200V is applied to the ion-gate plates. At +/−100V the whole ion beam will hit the detector. Therefore adjusting the potential difference over a range of +/−200V allows the effective transmission of the ion-gate to be adjusted from 0% to 100%.

Referring back now to FIG. 3(*a*), in some examples of the invention the control unit 290 may be configured to control the TOF mass spectrometer 200 to perform at least one acquisition cycle that includes:

- operating the ion source 210 to produce and emit ions having a plurality of mass/charge (m/z) values so that ions having different m/z values follow the path extending between the ion source 210 and the detector 250 and reach the detector at different times;
- operating the detector 250 to produce an output current representative of ions having different m/z values reaching the detector 250;
- operating the variable voltage unit 285 to apply a dynamic potential difference between the electrodes of the ion gate 280 during the acquisition cycle so that a magnitude of the potential difference applied between the electrodes varies within the acquisition cycle;
- wherein the dynamic potential difference is configured so that, within the/each acquisition cycle; a gate closed potential difference is applied between the electrodes of the ion gate 280 by the variable voltage 285 unit such that the ion gate 280 is in a gate closed state at the first time, when ions having a first m/z value are passing through the ion gate 280;
- an intermediate potential difference is applied between the electrodes of the ion gate 280 by the variable voltage unit 285 such that the ion gate 280 is in an intermediate state at the second time that is later than the first time, when ions having a second m/z value are passing through the ion gate 280, wherein the ion gate 280, in the intermediate state, deflects the ions passing through the ion gate 280 such that some but not all of the ions passing through the ion gate are prevented from reaching the detector 250; and
- a gate open potential difference is applied between the electrodes of the ion gate 280 by the variable voltage unit 285 such that the ion gate 280 is in a gate open state at a third time later than the second time, when ions having a third m/z value are passing through the ion gate 280.

In this particular example, the dynamic voltage waveform is configured to vary the potential difference applied between the at least two electrodes of the ion gate 280 such that the potential difference changes continuously from the first potential difference to the second potential difference and from the second potential difference to the third potential difference.

"Gate open", "gate closed", and "intermediate" voltages/states have already been discussed in detail above and so this discussion does not need to be repeated here.

A dynamic potential difference exhibiting these characteristics, and the effect of the dynamic potential difference on the proportion of ions reaching the detector 250 ("ion transmission") is shown in FIG. 3(*b*).

As shown in FIG. 3(*b*), the potential difference applied between the electrodes of the ion gate 280 smoothly changes from the gate closed potential difference, to various intermediate potential differences, to the gate open potential difference, which causes corresponding changes in the ion transmission.

In this way, in the range of m/z values for which the TOF mass spectrometer is configured for use, the intensity of the ions reaching the detector is matched to the effective gain for that mass. With the control unit 290 configured as described above, the ion transmission starts at a low value as low mass ions pass through the ion-gate and gradually increases as high mass ions pass through the ion-gate. In this way the low mass ions are detected with similar intensities to the high mass ions and do not saturate the detector. In other words, the amount of ions reaching the detector can be controlled as a function of m/z value, preferably so as to compensate for a gain characteristic of the detector 250 or to otherwise adjust the relative intensities of m/z peaks in a desired manner with a good speed of response compared with the dynamic gain method as discussed e.g. in GB2537148.

Figure 7:
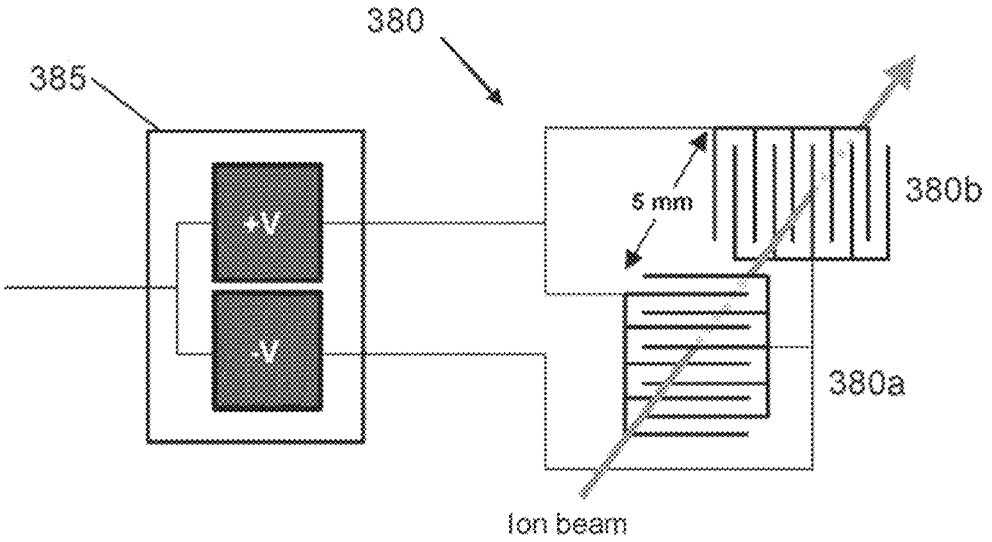
FIG. 7 is a schematic diagram of an ion gate incorporating two BN gates and a power supply scheme which may be used with the TOF mass spectrometer of FIG. 3(*a*).

FIG. 7 shows a variable voltage unit 385 for applying a variable voltage to an ion gate 380 that may be used in the TOF mass spectrometer 200 of FIG. 3(*a*).

The ion gate 380 of FIG. 7 incorporates two BN gates 380*a*, 380*b*, separated by a small distance which is preferably less than 20 mm, more preferably less than 10 mm, and which in this case is 5 mm. This type of ion-gate design provides the highest blanking ratio combined with fastest switching. Typical dimensions are 20 um diameter wires spaced 500 um apart with an open aperture of 6 mm diameter. These can be operated with 500V pulses with widths from 50 ns and 10 ns rise-time. They can achieve selection resolutions in excess of 500 FWHM (that is to say 2 Da window at 1000 Da nominal m/z). Each BN gate comprises a set of parallel conductive wires. The plurality of conductive wires of the first BN gate 380*a*extend in an orthogonal direction to the path of the ion beam and the plurality of conductive wires of the second BN gate 380*b* extend orthogonally to both the conductive wires of the first BN gate and the path of the ion beam. Here, the variable voltage unit 385 is configured to apply a voltage with a positive polarity (+V) to every second wire of each BN gate 380*a*, 380*b* and a voltage with a negative polarity (−V) to the remaining wires of each BN gate 380*a*, 380*b*. The magnitude of the positive polarity voltage (+V) is the same as the magnitude of the negative polarity voltage (−V).

As noted previously herein, while a double BN gate produces better ion blanking than a single BN gate, it might not be quite as effective as a single BN ion gate at controlling the proportion of ions being detected by the detector in accordance with the present invention. A single gate may also afford a wider voltage range. So ultimately, whether a single BN gate or double BN gate is used may vary depending on application requirements. The selection of a single or double BN gate may therefore vary according to application requirements.

A skilled person would therefore appreciate from the disclosure herein that it is also possible for the ion gate 380 to include just one BN gate, rather than two BN gates as shown here.

FIGS. 8 to 13 are simulated time of flight spectra created using an ion trajectory simulation model of a MALDI TOF mass spectrometer. The model incorporates all of the characteristic dimensions and voltages of a commercial instrument (MALDI-7090, Shimazdu Corp) which includes components corresponding to the TOF mass spectrometer 200 shown in FIG. 3(*a*), including the ion gate 280 which for this instrument is implemented by the ion gate 380 including two BN gates 380*a*, 380*b* as shown in FIG. 7, as well as the control unit 290 and variable voltage unit 285. The model includes a pulsed extraction MALDI ion source, having the initial velocity and spatial distributions known to be representative of those on the real instrument (the values have been established over many years of MALDI TOF-MS and TOF-MS/MS ion optics development). For each m/z value, 500 ions were emitted from the MALDI ion source during each simulation acquisition. The analyser consists of a field free region and a curved-field reflectron (CFR).

FIGS. 8 to 13 are spectra with time of flight (ranging from approximately 45.5 μs to 90.5 μs) on the x-axis and the number of ions detected (out of the 500 ions emitted for each peak) on the y-axis. Each spectrum therefore displays the number of ions detected as a function of their m/z value. Each spectrum has peaks representing singly charged ions with masses ranging from 600 Da to 2400 Da in 200 Da increments.

Figure 8:
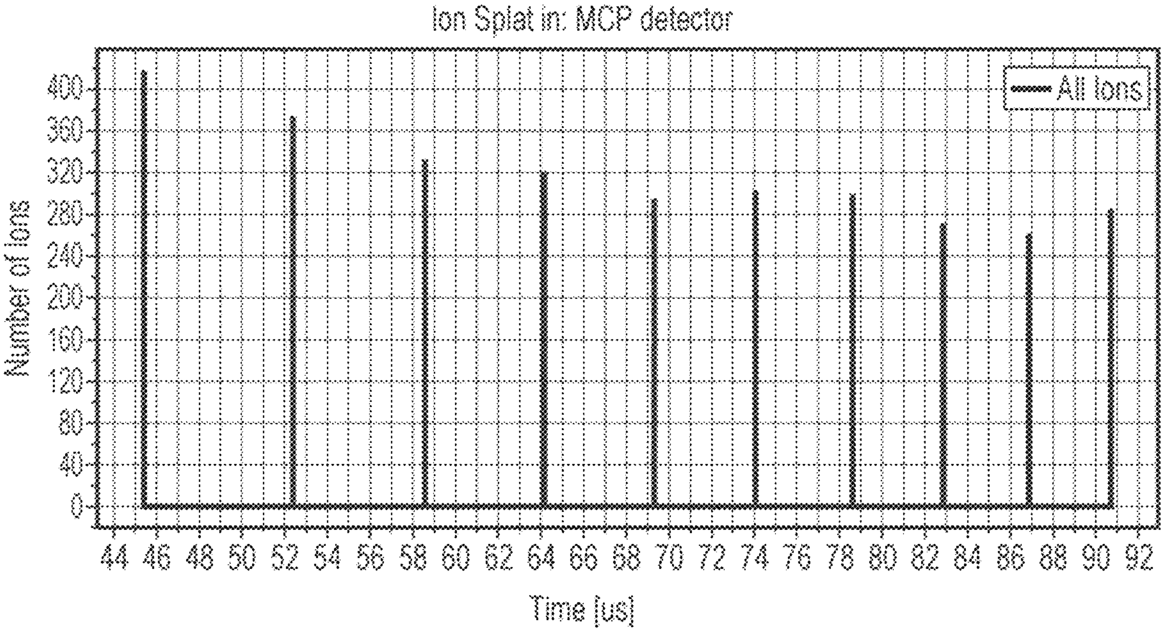
FIGS. 8 to 13 are a simulated time of flight spectra acquired using a model of a MALDI TOF mass spectrometer.
Figure 9:
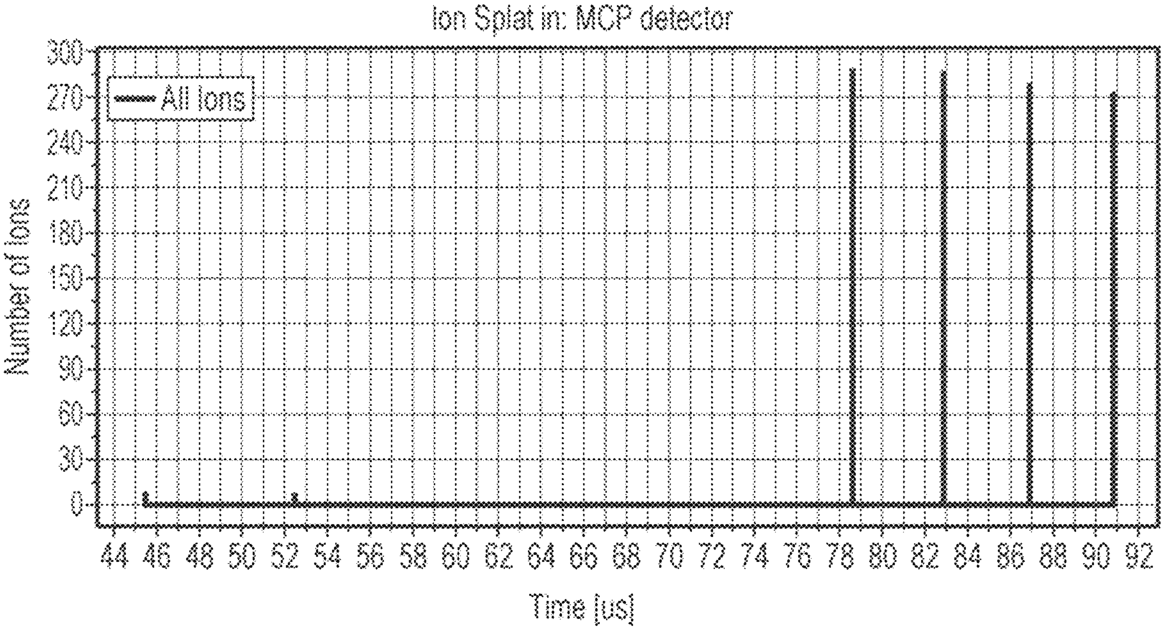
Figure 10:
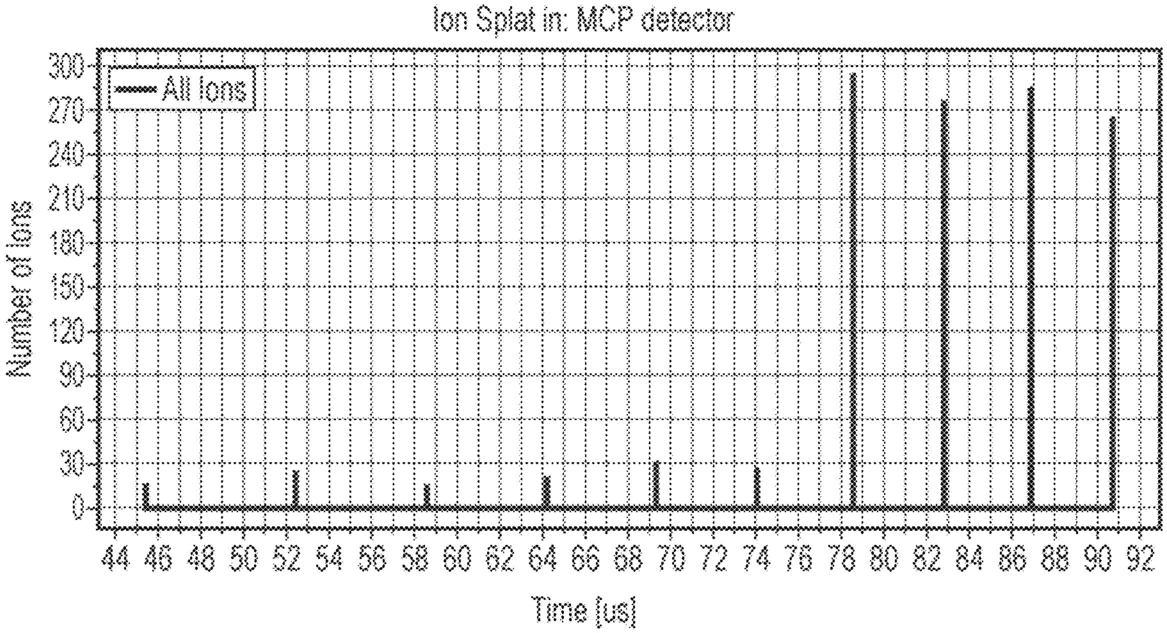
Figure 11:
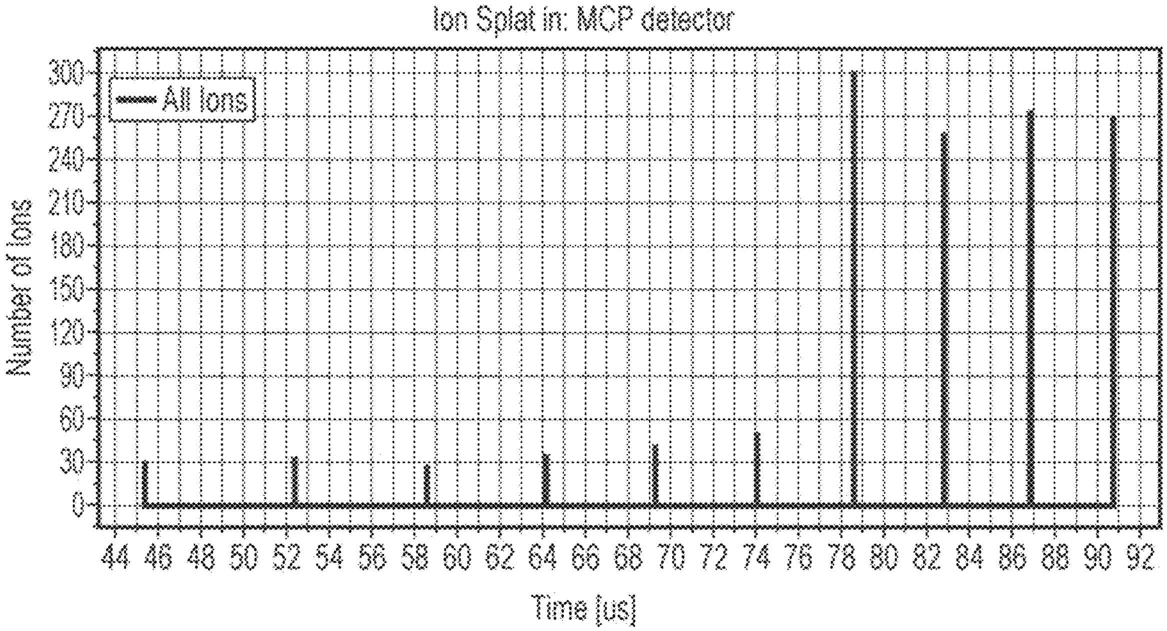
Figure 12:
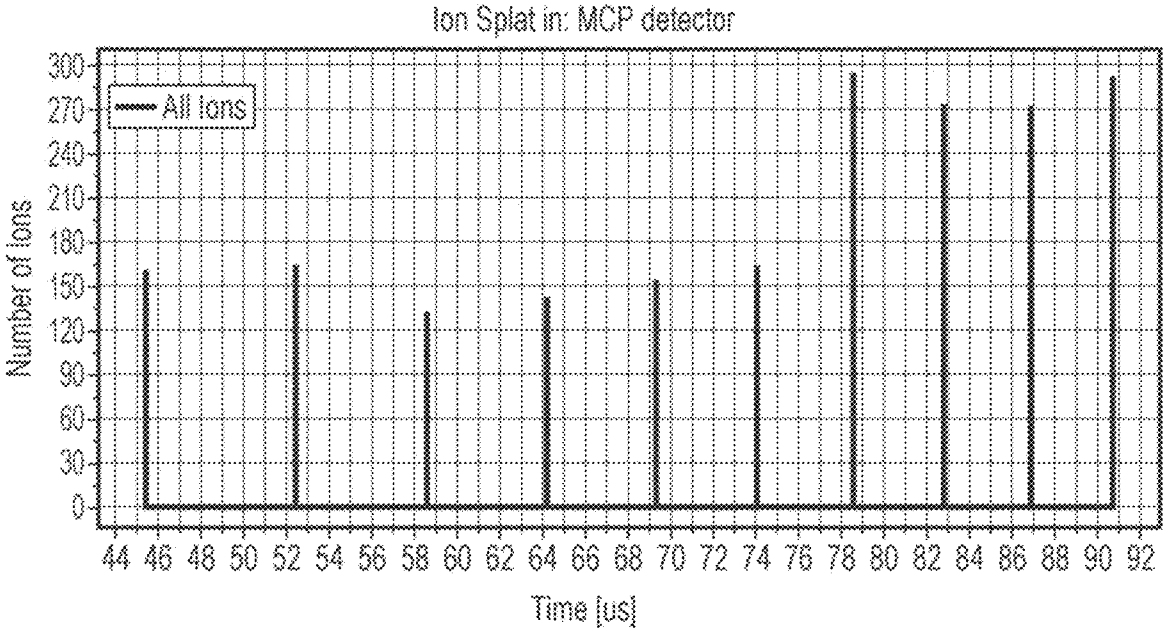
Figure 13:
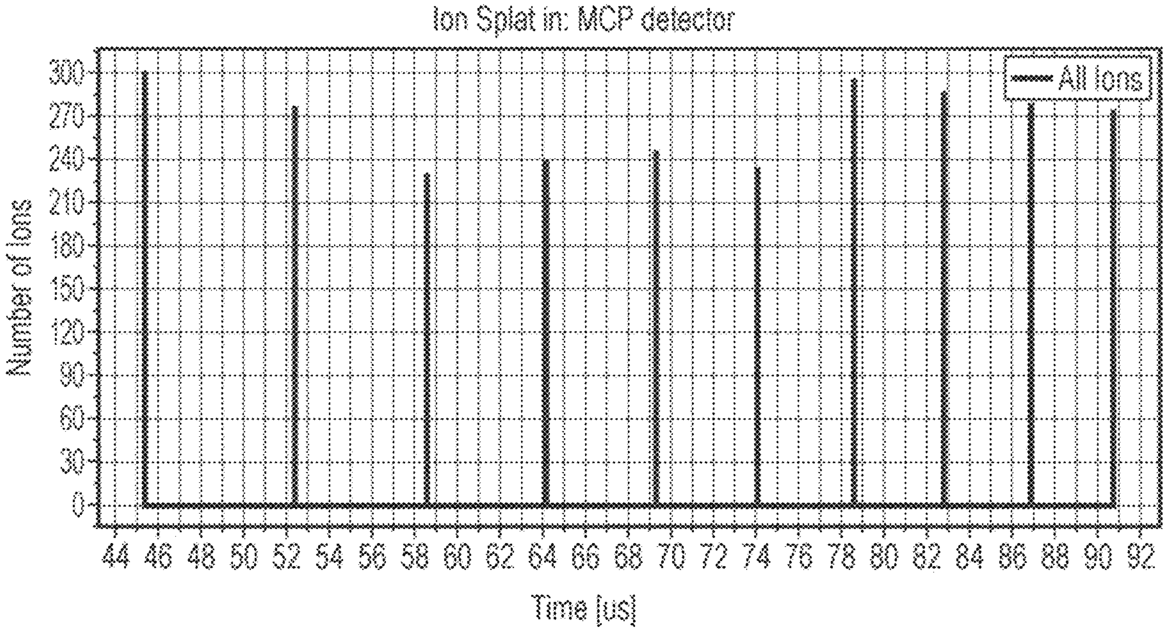

FIG. 8 shows a simulated time of flight spectrum where no voltage was applied to the wires of the two BN gates during the simulated acquisition, corresponding to a "gate open" state of the ion gate as described above. The peaks are not all exactly the same intensity because the transmission of ions is partly mass dependent and also because the initial ion velocity and spatial distributions have statistics applied to emulate the variation of these parameters in a real ion-source. This spectrum is used to correct for effects such as variation in initial ion yield due to, for example, sample concentration and the detector gain varying with mass. Therefore, it is possible to isolate the effect of the ion gate on the proportion of ions hitting the detector from other aspects of instrument performance.

FIGS. 9 to 13 are simulated time of flight spectra using the same model used to produce FIG. 8, but for which no voltage was applied to the wires of the two BN gates for ions of masses ranging from 1600 Da to 2400 Da (corresponding to a "gate open" state of the ion gate), and a static voltage was applied to alternate wires of the two BN gates for ions with masses ranging from 600 Da to 1600 Da. To produce the simulation spectra of FIGS. 9, 10, 11, 12 and 13, a static voltage of +/−100V, +/−70V, +/−60V, +/−40V, +/−30V respectively was applied to the wires of the two BN gates for ions with masses ranging from 600 Da to 1600 Da.

As can be seen from FIGS. 9 to 13, for ions with masses of 600 Da to 1600 Da, the transmission of two BN gates (the percentage of ions produced in the ion source that reach the detector and are detected) increases from approximately 5% when a potential difference of 200V (+/−100V) is applied to the wires of the two BN gates, up to approximately 70-80% when a potential difference of 60V (+/−30V) is applied to the wires of the two BN gates. These are examples of intermediate states of the ion gate, since it is clear that some but not all ions in the mass range 600 Da-1600 Da are reaching the detector in these states, owing to deflection of ions by the BN gates.

Figure 14A:
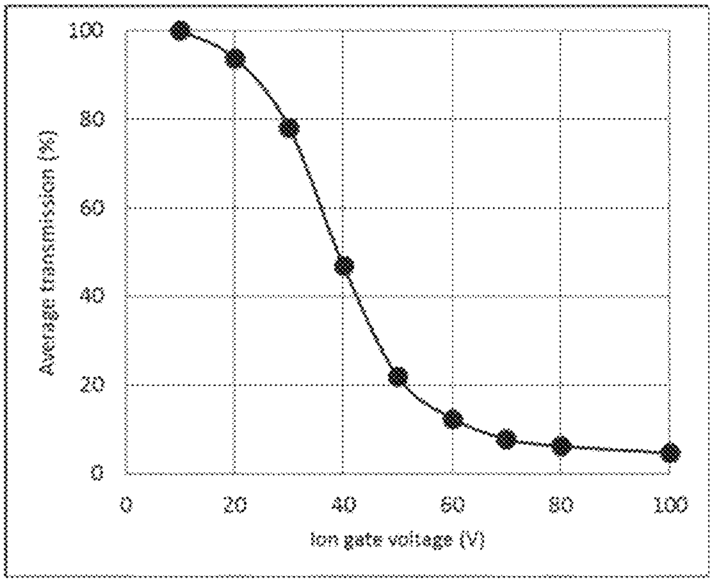
FIG. 14(*a*) illustrates the simulated proportion of ions transmitted as a function of the voltage applied to the BN gates resulting from the simulations illustrated in FIGS. 8 to 13.
Figure 14B:
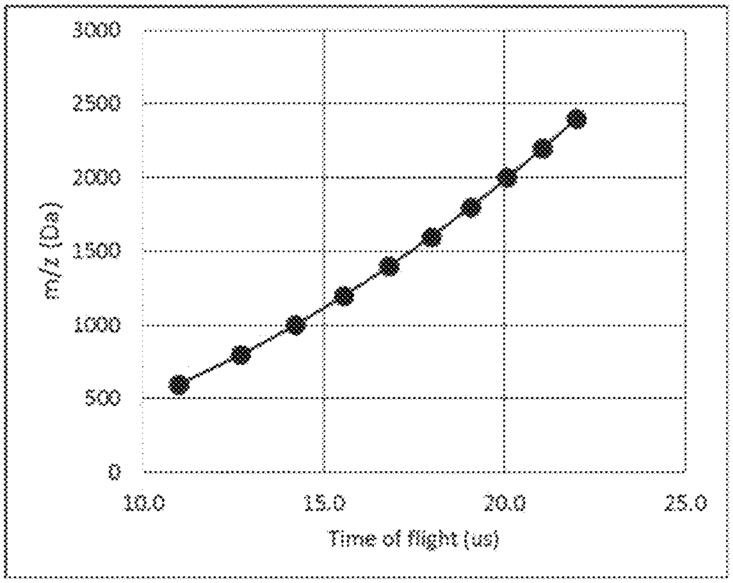

FIG. 14(*a*) is a graph illustrating the simulated proportion of ions transmitted and detected as a function of the voltage applied to alternative wires of two BN gates, for ions with masses ranging from 600 Da to 1600 Da resulting from the simulations illustrated in FIGS. 8 to 13.

FIG. 14(*b*) shows the times of flight to the ion gate for ions with m/z values ranging from 600 Da to 2400 Da resulting from the simulations illustrated in FIGS. 8 to 13.

As a skilled person would readily appreciate based on the disclosure herein, a dynamic voltage waveform configured to provide a dynamic potential difference which controls the amount of ions reaching the detector 250 as a function of m/z value can be constructed based on the information shown in FIGS. 14(*a*) and 14(*b*). A skilled person could readily collect information corresponding to FIGS. 14(*a*) and 14(*b*) for a practical instrument, based on the disclosure herein.

Figure 15:
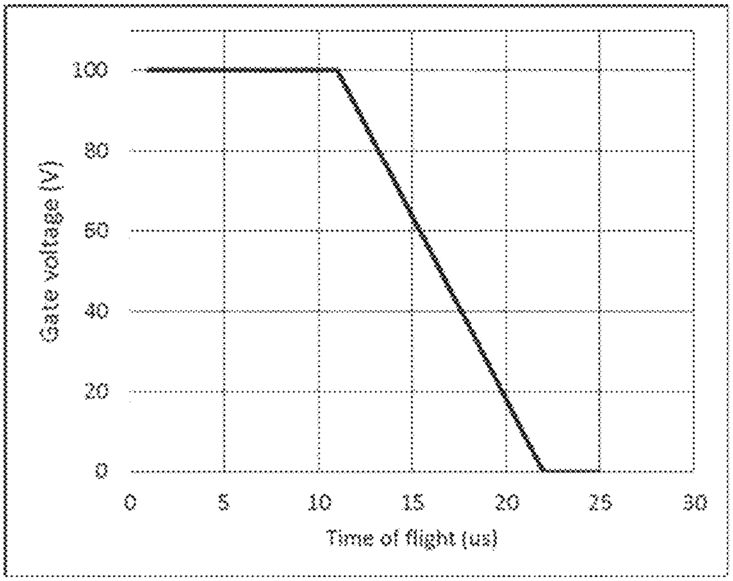
FIG. 15 illustrates an example voltage waveform applied to the parallel wires of two BN gates during a simulated acquisition cycle to produce the simulated time of flight spectrum of FIG. 16, using the same model that was used to produce the results shown in FIGS. 8 to 13.
Figure 16:
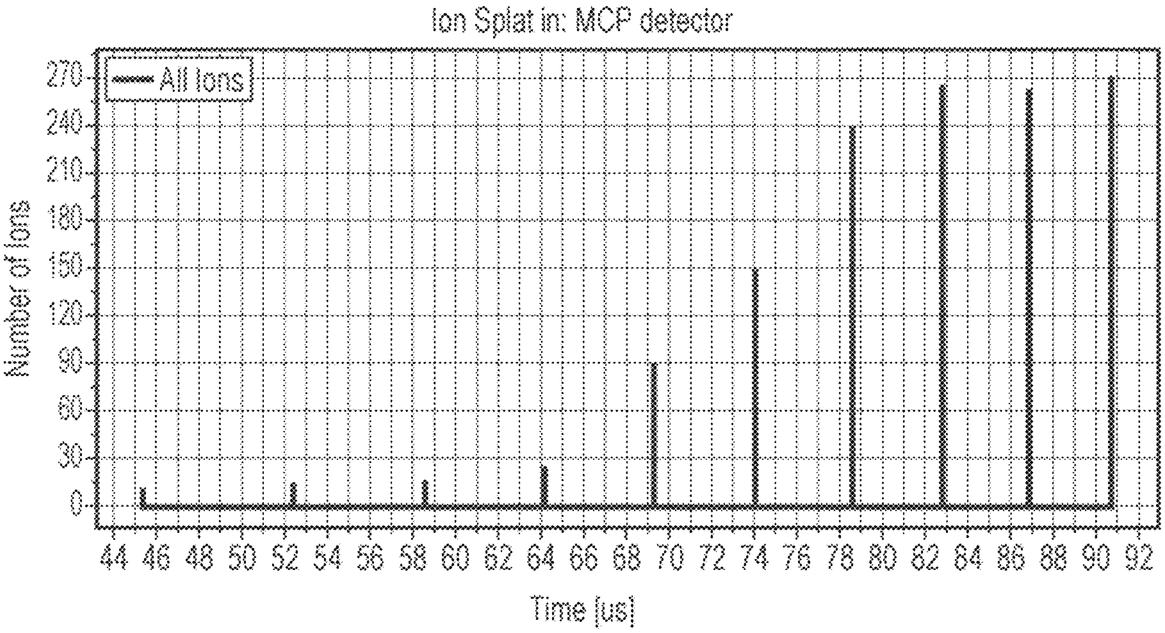
FIG. 16 is a simulated time of flight spectrum resulting from the voltage waveform of FIG. 15.

FIG. 15 illustrates an example voltage waveform applied to the parallel wires of two BN gates during a simulated acquisition cycle to produce the simulated time of flight spectrum of FIG. 16, using the same model that was used to produce the results shown in FIGS. 8 to 13.

FIG. 16 displays the time of flight of the ions on the x-axis and the number of ions detected on the y-axis. The peaks represent singly charged ions with masses ranging from 600 Da to 2400 Da in 200 Da increments.

In the example of FIGS. 15 and 16, the gate voltage is set to be 100V until 11 us when the 600 Da ions are at the ion-gate and is ramped down in a further 11 us to zero when the 2400 Da ions reach the ion-gate, such that the ion transmission goes from less than 5% to 100% and the intensity mass profile mirrors the transmission curve in FIG. 14(*a*). The result, as shown in FIG. 16, is that the intensity of the ions ramps up smoothly from 1000 Da to 2000 Da and clearly demonstrates the use of the ion gate in various intermediate states to control the ion intensities at the detector 250.

Figure 17:
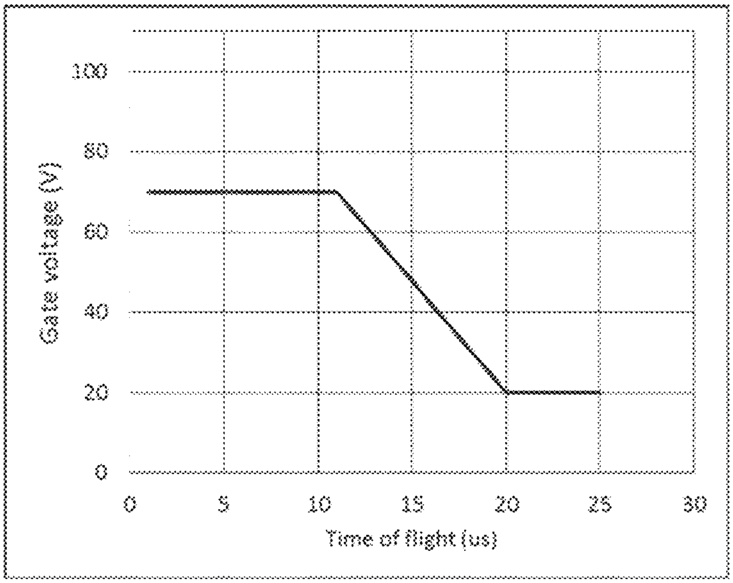
FIG. 17 illustrates an example voltage waveform applied to the parallel wires of the BN gate of the ion gate in the TOF mass spectrometer of FIG. 3(*a*) during a simulated acquisition cycle as a function of the time of flight of the ions to the ion gate.
Figure 18:
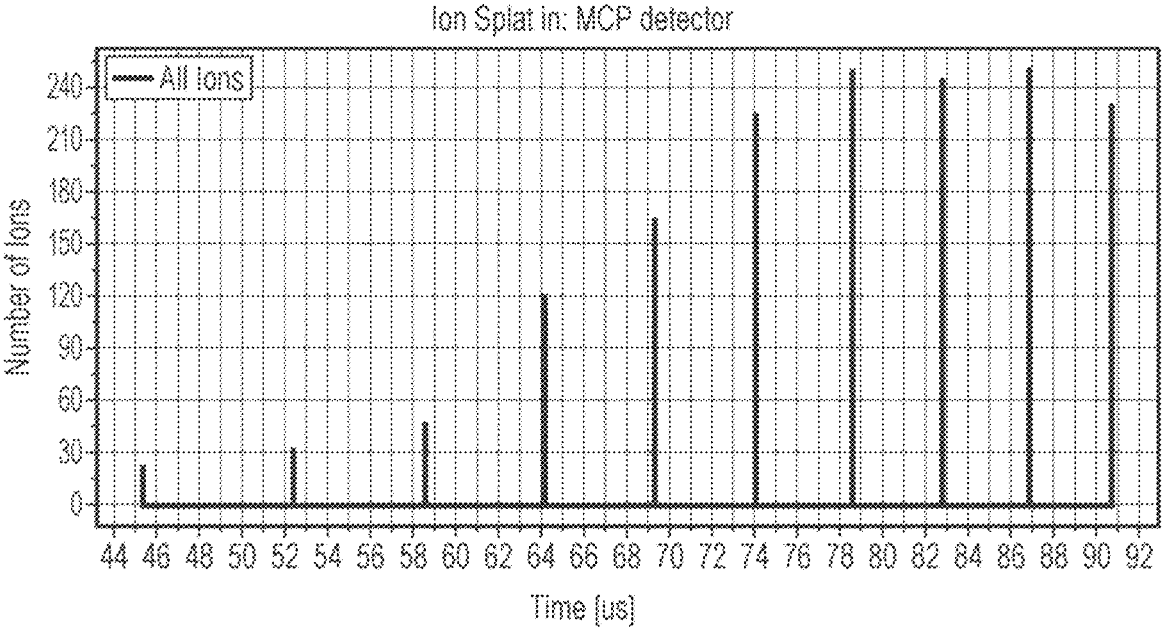
FIG. 18 is a simulated time of flight spectrum resulting from the voltage waveform of FIG. 17.

FIG. 17 illustrates an example voltage waveform applied to the parallel wires of two BN gates during a simulated acquisition cycle to produce the simulated time of flight spectrum of FIG. 18, using the same model that was used to produce the results shown in FIGS. 8 to 13.

FIG. 18 displays the time of flight of the ions on the x-axis and the number of ions detected on the y-axis. The peaks represent singly charged ions with masses ranging from 600 Da to 2400 Da in 200 Da increments.

In the example of FIGS. 17 and 18, instead of starting at +/−100V, the ion-gate voltage is started at 70V where the transmission is around 10% and ramps down to 20V where the transmission is about 90% the intensity ramps smoothly from 600 Da to 1800 Da. Note that in this case the ion transmission will not reach 100% unless the ion-gate voltage is subsequently set to zero FIG. 19 is an example of experimental (i.e. non-simulated) data showing spectra from the commercial MALDI-TOF instrument simulated to produce the data shown in FIGS. 8-18 (Shimazdu MALDI-7090) for a peptide sample containing ions with masses ranging from 1046 Da to 2465 Da, when the instrument was operated in blanking mode and the power supplied to the BN gate was manually adjusted to obtain intermediate states of the ion gate 280.

Figures 19A, 19B, 19C:
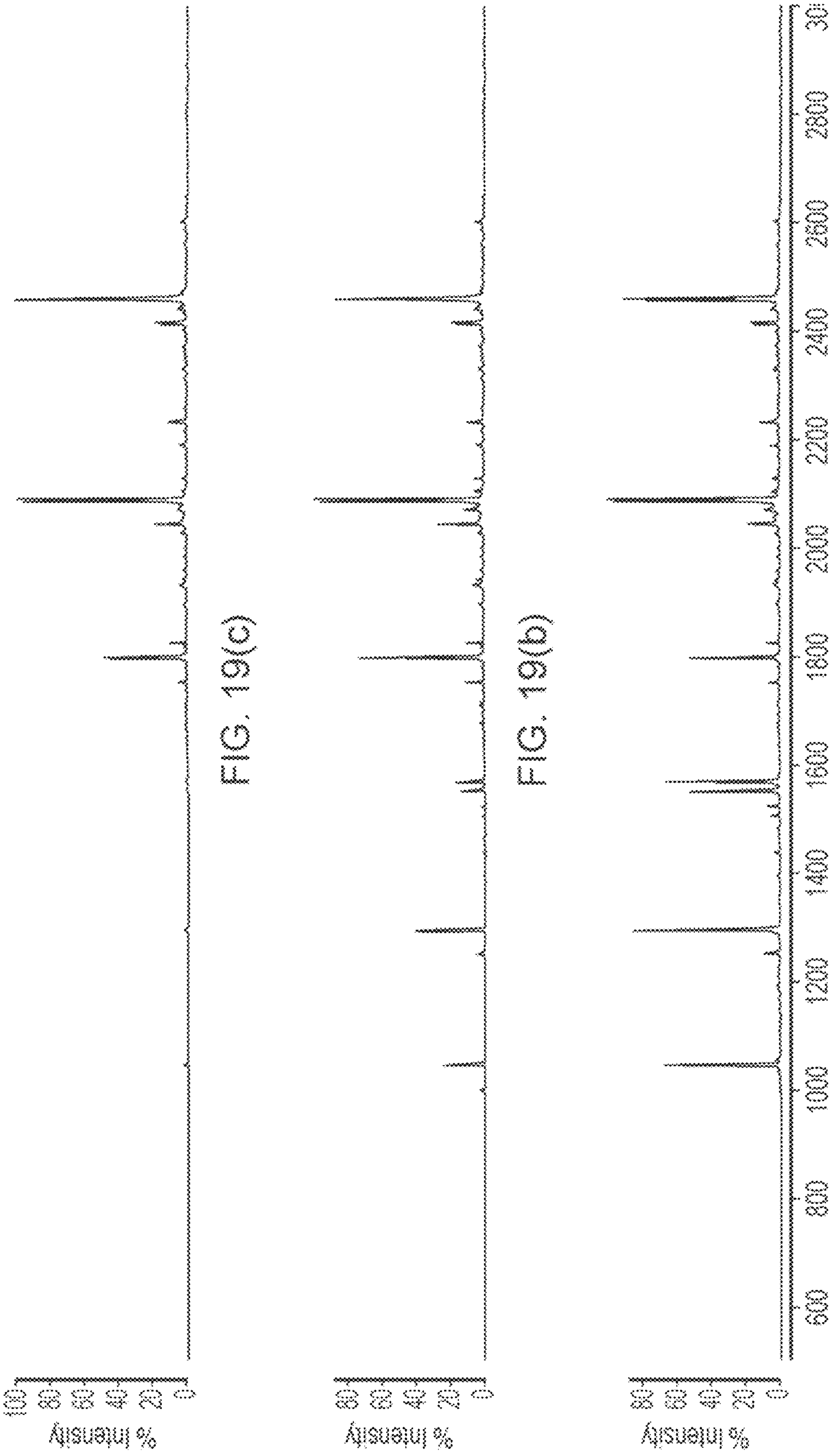
FIG. 19 shows example spectra from a commercial MALDI TOF-MS instrument for a peptide sample containing ions with masses ranging from 1046 Da to 2465 Da with the BN gate in (a) open, (b) intermediate, and (c) closed states.
Figure 20:
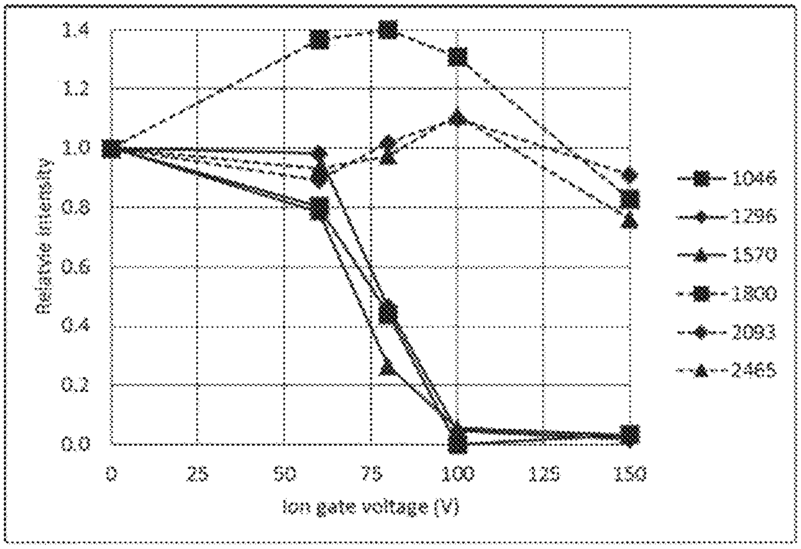
FIG. 20 is a graph showing results of tests using a commercial MALDI TOF-MS instrument for the proportion of ions detected as a function of the voltage applied to a BN gate, for a peptide sample containing ions with masses ranging from 1046 Da to 2465 Da.

To obtain the data shown in FIG. 19, a MALDI sample comprising a mixture of peptides with masses ranging from 1046 Da to 2465 Da was analysed whilst the BN gate was set to blank masses up to 1600 Da. In the normal operation of the ion gate this would mean that ions below 1600 m/z would be blanked and have essentially zero intensity at the detector. Ions above 1600 m/z pass through the ion gate when switched off and have essentially 100% intensity at the detector. The resulting spectra are shown for (a) the BN gate open state, (c) the BN gate closed state and (b) an intermediate state of the BN gate The voltage applied to the ion-gate was changed between acquisitions and the transmission of each ion of mass relative to the 0V peak is shown by FIG. 20. Peaks representing ions with masses of 1800 Da, 2093 Da and 2465 Da were not affected by the ion gate. However, the intensity of the peaks representing ions with masses of 1046 Da, 1296 Da and 1570 Da varied with the voltage applied to the ion gate, with a transmission of less than 5% when a potential difference of 200V (+/−100V) was applied to the ion gate, and a transmission of 100% when a potential difference of 100V (+/−50V) was applied to the ion gate.

From FIG. 20, it is demonstrated that the experimental transmission characteristics of ions when operating an ion gate in analogue mode using a commercial instrument are similar to the simulated transmission characteristics of a simulated ion gate.

Figure 21:
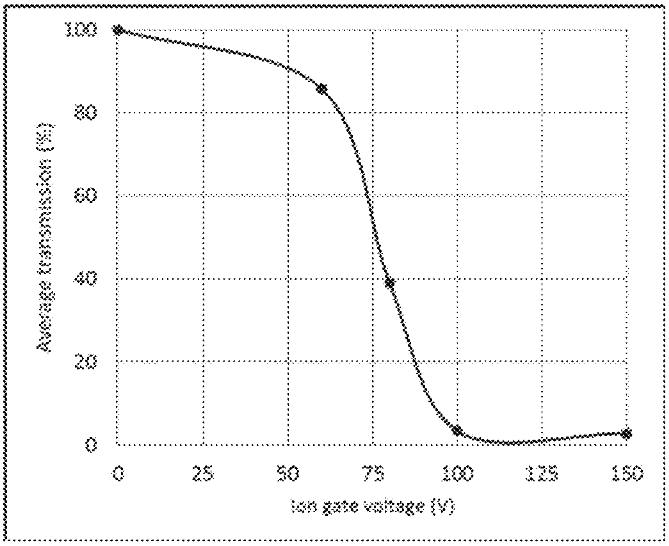
FIG. 21 is a graph from tests with a commercial MALDI TOF-MS instrument illustrating the average proportion of ions detected as a function of the voltage applied to a BN gate, for a peptide sample containing ions with masses ranging from 1046 Da to 1570 Da.

FIG. 21, obtained in the same manner as FIG. 20, is a graph illustrating the average proportion of ions detected as a function of the voltage applied to the ion gate 280, for a peptide sample containing ions with masses ranging from 1046 Da to 1570 Da.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A time of flight ("TOF") mass spectrometer having:
- an ion source;
- a detector;
- an ion gate positioned on a path extending between the ion source and the detector;
- a variable voltage unit; and
- a control unit;
- wherein the control unit is configured to control the TOF mass spectrometer to perform at least one acquisition cycle that includes:
  - operating the ion source to produce and emit ions having a plurality of mass/charge (m/z) values so that ions having different m/z values follow the path extending between the ion source and the detector and reach the detector at different times;
  - operating the detector to produce an output current representative of ions having different m/z values reaching the detector;
  - operating the variable voltage unit to apply a dynamic potential difference between at least two electrodes of the ion gate during the acquisition cycle so that a magnitude of the potential difference applied between the at least two electrodes varies within the acquisition cycle;
- wherein the dynamic potential difference is configured so that, within the/each acquisition cycle;
  - a first potential difference is applied between the at least two electrodes of the ion gate by the variable voltage unit such that the ion gate is in a first state at a first time, when ions having a first m/z value are passing through the ion gate; and
  - a second potential difference is applied between the at least two electrodes of the ion gate by the variable voltage unit such that the ion gate is in a second state at a second time that is later than the first time, when ions having a second m/z value are passing through the ion gate;
- wherein at least one of the first and second states of the ion gate is an intermediate state in which the ion gate deflects the ions passing through the ion gate such that some but not all of the ions passing through the ion gate are deflected by the ion gate so as to miss the detector, being thereby prevented from reaching the detector such that they are not detected, and such other ions among said ions passing through the ion gate simultaneously are deflected by the ion gate so as to not miss the detector, being thereby permitted to reach the detector such that they are detected.

2. A TOF mass spectrometer according to claim 1, wherein a dynamic voltage waveform is applied by the variable voltage unit and is configured to vary the dynamic potential difference so that, within the/each acquisition cycle:

a gate closed potential difference is applied between the at least two electrodes of the ion gate by the variable voltage unit such that the ion gate is in a gate closed state at one or more predetermined gate closed times, when ions having one or more predetermined gate closed m/z values are passing through the ion gate, wherein the ion gate prevents substantially all of the ions emitted from the ion source and passing through the ion gate from reaching the detector when it is in the gate closed state.

3. A TOF mass spectrometer according to claim 1, wherein a dynamic voltage waveform is applied by the variable voltage unit and is configured to vary the dynamic potential difference so that, within the/each acquisition cycle:

a gate open potential difference is applied between the at least two electrodes of the ion gate by the variable voltage unit such that the ion gate is in a gate open state at one or more predetermined gate open times, when ions having one or more predetermined gate open m/z values are passing through the ion gate, wherein the ion gate prevents substantially none of the ions emitted from the ion source and passing through the ion gate from reaching the detector when it is in the gate open state.

4. A TOF mass spectrometer according to claim 2, wherein the variable voltage unit is configured to apply an intermediate potential difference between the at least two electrodes of the ion gate to achieve the intermediate state of the ion gate, in which the magnitude of the intermediate potential difference is between that of a gate open potential difference and the gate closed potential difference.

5. A TOF mass spectrometer according to claim 2, and optionally claim 4, wherein the magnitude of the difference between the magnitude of a gate open potential difference and the magnitude of the gate closed potential difference is 1000V or less.

6. A TOF mass spectrometer according to claim 1, wherein the dynamic potential difference is configured so that, within the/each acquisition cycle, the ion gate is put in different intermediate states at different times during the acquisition cycle, whereby each intermediate state prevents a different proportion of ions passing through the ion gate from reaching the detector, wherein each intermediate state is obtained by the variable voltage unit applying a different intermediate potential difference between the at least two electrodes of the ion gate.

7. A TOF mass spectrometer according to claim 1, wherein a dynamic voltage waveform is applied by the variable voltage unit and is configured to vary the dynamic potential difference to vary the potential difference applied between the at least two electrodes of the ion gate such that the potential difference changes continuously.

8. A TOF mass spectrometer according to claim 1, wherein the magnitude of the first potential difference is larger than the magnitude of the second potential difference.

9. A TOF mass spectrometer according to claim 1, wherein the magnitude of the first potential difference is smaller than the magnitude of the second potential difference.

10. A TOF mass spectrometer according to claim 1, wherein a dynamic voltage waveform is applied by the variable voltage unit and is configured to vary the dynamic potential difference to vary the potential difference applied between the at least two electrodes of the ion gate such that the potential difference progressively decreases in magnitude with time within the/each acquisition cycle.

11. A TOF mass spectrometer according to claim 1, wherein the ion gate includes a set of parallel wires distributed at different positions along a lateral axis that is transverse with respect to the path extending between the ion source and the detector.

12. A TOF mass spectrometer according to claim 11, wherein the wires in the set have a thickness of 50 μm or less, and the separation between adjacent wires in the/each set is 1 mm or less.

13. A TOF mass spectrometer according to claim 1, wherein the ion source is a MALDI ion source.

14. A method of operating a TOF mass spectrometer according to claim 1, wherein the method includes the control unit controlling the TOF mass spectrometer to perform at least one acquisition cycle that includes:

operating the ion source to produce and emit ions having a plurality of mass/charge (m/z) values so that ions having different m/z values follow the path extending between the ion source and the detector and reach the detector at different times;

operating the detector to produce an output current representative of ions having different m/z values reaching the detector;

operating the variable voltage unit to apply a dynamic potential difference between at least two electrodes of the ion gate during the acquisition cycle so that a magnitude of the potential difference applied between the at least two electrodes varies within the acquisition cycle;

wherein the dynamic potential difference is configured so that, within the/each acquisition cycle;

the first potential difference is applied between the at least two electrodes of the ion gate by the variable voltage unit such that the ion gate is in the first state at the first time, when ions having a first m/z value are passing through the ion gate; and the second potential difference is applied between the at least two electrodes of the ion gate by the variable voltage unit such that the ion gate is in the second state at the second time that is later than the first time, when ions having a second m/z value are passing through the ion gate.

15. A method of modifying an initial TOF mass spectrometer to provide the mass spectrometer according to claim 1 wherein the method includes:

adding the ion gate on the path extending between the ion source and the detector, and adding the variable voltage unit to the initial TOF mass spectrometer; and configuring the control unit to perform said at least one acquisition cycle.

16. A method of modifying an initial TOF mass spectrometer to provide the mass spectrometer according to claim 1, wherein the method includes configuring the control unit to perform said at least one acquisition.

17. A TOF mass spectrometer according to claim 4, wherein the magnitude of the difference between the magnitude of a gate open potential difference and the magnitude of the gate closed potential difference is 1000V or less.

* * * * *